(12) United States Patent
Klemmer et al.

(10) Patent No.: US 10,797,921 B2
(45) Date of Patent: Oct. 6, 2020

(54) THRESHOLD COMPUTATION CIRCUIT FOR S-FSK RECEIVER, INTEGRATED CIRCUIT, AND METHOD ASSOCIATED THEREWITH

(71) Applicant: Texas Instruments Incorporated, Dallas, TX (US)

(72) Inventors: Nikolaus Klemmer, Dallas, TX (US); Amneh Mohammed Akour, Plano, TX (US); Abhijit Anant Patki, Bangalore (IN); Timothy Patrick Pauletti, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/450,065

(22) Filed: Jun. 24, 2019

(65) Prior Publication Data
US 2020/0259690 A1    Aug. 13, 2020

Related U.S. Application Data

(60) Provisional application No. 62/804,441, filed on Feb. 12, 2019.

(51) Int. Cl.
*H04L 27/14* (2006.01)
*H04L 27/148* (2006.01)
*H04B 1/69* (2011.01)

(52) U.S. Cl.
CPC ............. *H04L 27/148* (2013.01); *H04B 1/69* (2013.01)

(58) Field of Classification Search
CPC . H04L 27/14; H04L 27/1563; H04L 27/1525; H04L 9/30; H04L 27/12; H04B 3/542
(Continued)

(56) References Cited

U.S. PATENT DOCUMENTS 7,884,278 B2   2/2011  Powell et al.
8,013,472 B2   9/2011  Adest et al.
(Continued)

OTHER PUBLICATIONS

"SunSpec® Rapid Shutdown Transmit and Receive Reference Design" Texas Instruments, TI Designs: TIDA-060001, TIDUE68-May 2018, 39 pages.
(Continued)

*Primary Examiner* — Khai Tran
(74) *Attorney, Agent, or Firm* — Lawrence J. Bassuk; Charles A. Brill; Frank D. Cimino

(57) ABSTRACT

A threshold computation circuit includes an input circuit, a maximum filter circuit, a minimum filter circuit, and a calculating circuit. The input circuit receives a discrete frequency signal from a digital filtering circuit. The discrete frequency signal is based on an S-FSK waveform received by an S-FSK receiver associated with the digital filtering circuit. The discrete frequency signal is representative of digital logic levels in a series of data frames modulated using S-FSK to form the S-FSK waveform. The maximum filter circuit adjusts a maximum amplitude parameter based on the discrete frequency signal and a predetermined threshold. The minimum filter circuit adjusts a minimum amplitude parameter based on the discrete frequency signal and the predetermined threshold. The calculating circuit adapts the predetermined threshold for a next data frame based on the maximum and minimum amplitude parameters. An integrated circuit and a method for computing the threshold are also disclosed.

20 Claims, 11 Drawing Sheets

(58) Field of Classification Search
USPC ........................................................ 375/334
See application file for complete search history.

(56) References Cited

U.S. PATENT DOCUMENTS

| | | | |
|---|---|---|---|
| 8,035,249 | B2 | 10/2011 | Shaver, II et al. |
| 8,271,599 | B2 | 9/2012 | Eizips et al. |
| 8,274,172 | B2 | 9/2012 | Hadar et al. |
| 8,325,059 | B2 | 12/2012 | Rozenboim |
| 8,427,009 | B2 | 4/2013 | Shaver, II et al. |
| 8,531,005 | B2 | 9/2013 | Whitfield et al. |
| 8,587,151 | B2 | 11/2013 | Adest et al. |
| 8,653,689 | B2 | 2/2014 | Rozenboim |
| 8,669,675 | B2 | 3/2014 | Capp et al. |
| 8,816,535 | B2 | 8/2014 | Adest et al. |
| 8,823,218 | B2 | 9/2014 | Hadar et al. |
| 8,854,193 | B2 | 10/2014 | Makhota et al. |
| 8,933,321 | B2 | 1/2015 | Hadar et al. |
| 8,947,194 | B2 | 2/2015 | Sella et al. |
| 9,007,210 | B2 | 4/2015 | Avrutsky et al. |
| 9,112,379 | B2 | 8/2015 | Sella et al. |
| 9,124,139 | B2 | 9/2015 | Eizips et al. |
| 9,143,036 | B2 | 9/2015 | Avrutsky |
| 9,184,794 | B1 | 11/2015 | Ibrahim et al. |
| 9,184,967 | B1 | 11/2015 | Ibrahim et al. |
| 9,258,829 | B1 | 2/2016 | Ibrahim et al. |
| 9,377,765 | B2 | 6/2016 | Makhota et al. |
| 9,401,599 | B2 | 6/2016 | Har-Shai et al. |
| 9,397,612 | B2 | 7/2016 | Hadar et al. |
| 9,438,035 | B2 | 9/2016 | Capp et al. |
| 9,590,526 | B2 | 3/2017 | Adest et al. |
| 9,960,667 | B2 | 5/2018 | Adest et al. |
| 2002/0101916 | A1* | 8/2002 | Le Van Suu ........ H04L 27/0008 375/222 |
| 2010/0207592 | A1 | 8/2010 | Hester et al. |
| 2011/0140774 | A1 | 6/2011 | Kaya et al. |
| 2012/0049816 | A1 | 3/2012 | Hester |
| 2012/0049818 | A1 | 3/2012 | Hester |
| 2012/0093198 | A1 | 4/2012 | Dabak et al. |
| 2012/0126624 | A1 | 5/2012 | Hester et al. |
| 2012/0139345 | A1 | 6/2012 | Ye et al. |
| 2012/0314744 | A1 | 12/2012 | Vedantham et al. |
| 2012/0320931 | A1 | 12/2012 | Vedantham et al. |
| 2012/0320932 | A1 | 12/2012 | Xu et al. |
| 2012/0320995 | A1 | 12/2012 | Dabak et al. |
| 2012/0320996 | A1 | 12/2012 | Dabak et al. |
| 2012/0324322 | A1 | 12/2012 | Vedantham et al. |
| 2012/0327770 | A1 | 12/2012 | Vijayasankar et al. |
| 2012/0327987 | A1 | 12/2012 | Dabak et al. |
| 2013/0051268 | A1 | 2/2013 | Nassar et al. |
| 2013/0051320 | A1 | 2/2013 | Pande et al. |
| 2013/0051446 | A1 | 2/2013 | Vijayasankar et al. |
| 2013/0051482 | A1 | 2/2013 | Nassar et al. |
| 2013/0089124 | A1 | 4/2013 | Kim et al. |
| 2013/0101055 | A1 | 4/2013 | Pande et al. |
| 2013/0121425 | A1 | 5/2013 | Pande et al. |
| 2013/0223457 | A1 | 8/2013 | Pande et al. |
| 2013/0254615 | A1 | 9/2013 | Vijayasankar et al. |
| 2013/0266081 | A1 | 10/2013 | Pande et al. |
| 2013/0279515 | A1 | 10/2013 | Vijayasankar et al. |
| 2013/0294531 | A1 | 11/2013 | Vedantham et al. |
| 2013/0301649 | A1 | 11/2013 | Vijayasankar et al. |
| 2013/0322554 | A1 | 12/2013 | Vijayasankar et al. |
| 2013/0343403 | A1 | 12/2013 | Vijayasankar et al. |
| 2013/0343404 | A1 | 12/2013 | Vijayasankar et al. |
| 2014/0105313 | A1 | 5/2014 | Kim et al. |
| 2014/0146900 | A1 | 5/2014 | Dabak et al. |
| 2014/0229748 | A1 | 8/2014 | Li et al. |
| 2015/0043596 | A1* | 2/2015 | Lin ..................... H04L 27/36 370/437 |
| 2015/0071077 | A1 | 3/2015 | Vijayasankar et al. |
| 2015/0071306 | A1 | 3/2015 | Lin et al. |
| 2015/0071364 | A1 | 3/2015 | Batra et al. |
| 2015/0098569 | A1 | 4/2015 | Vijayasankar et al. |
| 2015/0180539 | A1 | 6/2015 | Vedantham et al. |
| 2015/0180680 | A1 | 6/2015 | Vijayasankar et al. |
| 2015/0236753 | A1 | 8/2015 | Pande et al. |
| 2015/0341084 | A1 | 11/2015 | Kim et al. |
| 2015/0341195 | A1* | 11/2015 | Kuba ................... H04L 27/148 375/303 |
| 2015/0349844 | A1 | 12/2015 | Vijayasankar et al. |
| 2015/0381355 | A1 | 12/2015 | Vijayasankar et al. |
| 2016/0043773 | A1 | 2/2016 | Pande et al. |
| 2016/0050045 | A1 | 2/2016 | Vijayasankar et al. |
| 2016/0079761 | A1 | 3/2016 | Pilawa-Podgurski et al. |
| 2016/0094373 | A1 | 3/2016 | Ibrahim et al. |
| 2016/0112548 | A1 | 4/2016 | Dabak et al. |
| 2016/0119028 | A1 | 4/2016 | Vijayasankar et al. |
| 2016/0127056 | A1 | 5/2016 | Soman et al. |
| 2016/0233923 | A1 | 8/2016 | Vedantham et al. |
| 2016/0323132 | A1 | 11/2016 | Ibrahim et al. |
| 2016/0330213 | A1 | 11/2016 | Vijayasankar et al. |
| 2016/0344450 | A1 | 11/2016 | Pande et al. |
| 2017/0093279 | A1 | 3/2017 | Hezar et al. |
| 2017/0195228 | A1 | 7/2017 | Vijayasankar et al. |
| 2017/0245879 | A1* | 8/2017 | Tilstra ............... A61B 17/32037 |
| 2017/0317803 | A1 | 11/2017 | Lin et al. |
| 2017/0366230 | A1 | 12/2017 | Pande et al. |
| 2018/0219480 | A1 | 8/2018 | Hezar et al. |
| 2018/0234526 | A1 | 8/2018 | Xu et al. |
| 2018/0294840 | A1 | 10/2018 | Vijayasankar et al. |
| 2019/0052313 | A1 | 2/2019 | Kim et al. |
| 2019/0140693 | A1 | 5/2019 | Kim et al. |
| 2019/0173643 | A1 | 6/2019 | Lin et al. |

OTHER PUBLICATIONS

"Communication Signal for Rapid Shutdown SunSpec Interoperability Specification" SunSpec Alliance, Approved, Version 34, Aug. 21, 2017, 25 pages.

"Communication Signal for Rapid Shutdown SunSpec Interoperability Specification" SunSpec Alliance, Test, Version 28, Oct. 28, 2016, 24 pages.

D. Shmilovitz, "On the control of photovoltaic maximum power point tracker via output parameters" IEEE Proc.—Electr. Power Appl., vol. 152, No. 2, Mar. 2005, pp. 239-248.

Robert C.N. Pilawa-Podgurski et al., "Submodule Integrated Distributed Maximum Power Point Tracking for Solar Photovoltaic Applications" IEEE Transactions on Power Electronics, vol. 28, No. 6, Jun. 2013, pp. 2957-2967.

Qin et al.., "A Distributed Approach to Maximum Power Point Tracking for Photovoltaic Submodule Differential Power Processing" IEEE Transactions on Power Electronics, vol. 30, No. 4, Apr. 2015, pp. 2024-2040.

Shenoy et al., "Differential Power Processing for Increased Energy Production and Reliability of Photovoltaic Systems" IEEE Transactions on Power Electronics, vol. 28, No. 6, Jun. 2013, pp. 2968-2979.

Robert C.N. Pilawa-Podgurski et al., "Integrated CMOS Energy Harvesting Converter With Digital Maximum Power Joint Tracking for a Portable Thermophotovoltaic Power Generator" IEEE Journal of Emerging and Selected Topics in Power Electronics, vol. 3, No. 4, Jun. 2015, pp. 1021-1035.

Pilawa-Podgurski, R.C.N. et al. "Low-power Maximum Power Point Tracker with Digital Control for Thermophotovoltaic Generators." Applied Power Electronics Conference and Exposition (APEC), 2010 Twenty-Fifth Annual IEEE. 2010. 961-967. Copyright © 2010, IEEE, pp. 961-967.

R.C.N. Pilawa-Podgurski, W. Li, I. Celanovic, D.J. Perreault "Integrated CMOS DC-DC Converter with Digital Maximum Power Point Tracking for a Portable Thermophotovoltaic Power Generator," IEEE Energy Conversion Congress and Exposition, 2011, pp. 197-204.

Intertek, Standard Update Notice (SUN), Issued: Aug. 14, 2018, 7 pgs.

Maxim Integrated, "Enable Flexible PV System Design with Cell-String Optimizers", Aug. 29, 2016, 9 pages.

Rick Ivins, "2014 NEC 690.12 Rapid Shutdown for String Inverters on Flat Roofs", Aug. 16, 2016, https://www.purepower.com/blog/nec-690-12-rapid-shutdown-of-pv-systems-on-buildings/, downloaded May 22, 2019, 5 pages.

(56) References Cited

OTHER PUBLICATIONS

Rick Ivins, "2017 Nec 690.12 Rapid Shutdown—Important Changes", https://www.purepower.com/blog/2017-nec-690.12-rapid-shutdown-important-changes/, downloaded May 22, 2019, 5 pages.

"SmartPSB2000L Smart PV Safety Box Quick Guide", Issue: 05, Part Number: 31509508, Date: Aug. 22, 2018, Huawei Technologies Col, Ltd., 12 pages.

Solar Edge Safety Functions Firefighting, "Firefighting & PV Systems—Risks and Solutions", https://www.solaredge.com/sites/default/files/firefighting_and_pv_systems_risks_and_solutions_eng.pdf, downloaded May 22, 2019, 26 pages.

Texas Instruments, "Solar Power Optimizer", http://www.ti.com/solution/solar_micro_converter_dc_dc_power_optimizer/, downloaded May 22, 2019, 2 pages.

Tigo® Flex MLPE, "Smart Module Platform", TS4, PV Module Integrated Platform, PV 2.0, Tigo Energy Inc., Sep. 10, 2018, 4 pages.

\* cited by examiner

THRESHOLD COMPUTATION CIRCUIT FOR S-FSK RECEIVER, INTEGRATED CIRCUIT, AND METHOD ASSOCIATED THEREWITH

This application claims priority to, and the benefit of, U.S. Provisional Patent Application Ser. No. 62/804,441, entitled "Adaptive Threshold Computation," filed Feb. 12, 2019, the entirety of which is incorporated herein by reference.

BACKGROUND

Spread frequency-shift keying (S-FSK) is a modulation and demodulation technique that combines advantages of a classical spread spectrum system (e.g., immunity against narrowband interferences) with advantages of a classical FSK system (e.g., low-complexity). An S-FSK transmitter outputs a tone at one of two frequencies depending on the value of a digital data bit. The frequencies 1002 may be referred to as a "mark" frequency ($f_M$) 1004 and a "space" frequency ($f_S$) 1006 (see the frequency spectrum 1000 of FIG. 10). For example, the S-FSK transmitter may transmit a signal on the "space" frequency 1006 to represent an "OFF" data bit and on the "mark" frequency 1004 to represent an "ON" data bit. The difference between S-FSK and classical FSK is that the $f_M$ and $f_S$ frequencies 1004, 1006 are farther apart from each other ("spread"). By placing $f_S$ 1006 far from $f_M$ 1004 the transmission quality of the two signals becomes independent. In other words, each frequency will have its own attenuation factor and local narrow-band noise spectrum. Thus, a narrow band interferer only affects one of the two frequency signals.

An S-FSK receiver performs FSK demodulation at the transmitted "mark" and "space" frequencies 1004, 1006 resulting in two demodulated signals, $f_M$ for the "mark" frequency 1004 and $f_S$ for the "space" frequency 1006 (see FIG. 10). If the average reception quality of the demodulated "mark" and "space" frequency signals is similar, a decision unit may decide the value of the digital data bit based on the demodulated signal with the higher reception quality. If, however, the average reception quality of one demodulated frequency signal is better than the quality of the other frequency signal, the decision unit may compare the demodulated signal of the better channel with a threshold (T) in deciding the value of the digital data bit. In other words, the S-FSK receiver could perform an FSK demodulation if both channels are good or an on-off keyed (OOK) demodulation if one channel is bad. In this scenario, the decision unit ignores the demodulated signal having lower quality. Depending on the application for S-FSK modulation, there could be periods of zero energy in the transmitted frequency signals. If the average reception quality is below the threshold (T) for both demodulated frequencies, the decision unit may interpret this condition as a zero-energy state. Higher level coding may be employed in the S-FSK transmitter to generate bit-streams that represent code words or commands which are modulated in the S-FSK waveform.

For example, SunSpec Interoperability Specification, Communication Signal for Rapid Shutdown, Version 34, describes an S-FSK communication system for transmission and reception of S-FSK waveforms carrying Barker codes representing a sequence of "ON" and "OFF" digital data bits that are modulated and demodulated based on the "mark" and "space" frequencies of the S-FSK modulation scheme. This S-FSK communication system uses power line communication (PLC) techniques to exchange sequences of Barker code words that represent commands for controlling photovoltaic (PV) arrays. For example, commands can be used to implement rapid shutdown or other commands can be used to keep the arrays alive. FIG. 11 shows PLC protocol requirements presented in SunSpec Interoperability Specification, Communication Signal for Rapid Shutdown, Version 34.

SUMMARY

An example of a threshold computation circuit for a spread frequency-shift keying (S-FSK) receiver includes an input circuit, a maximum filter circuit, a minimum filter circuit, and a calculating circuit. The input circuit receives a discrete frequency signal from a digital filtering circuit. The discrete frequency signal is based on an S-FSK waveform received by an S-FSK receiver associated with the digital filtering circuit. The discrete frequency signal is representative of digital logic levels in a series of data frames modulated using S-FSK to form the S-FSK waveform. Each data frame including an active portion and a zero energy portion. The active portion includes at least one data word and the zero energy portion includes at least one zero energy word. Each data word and zero energy word include multiple bit periods. The maximum filter circuit dynamically and selectively adjusts a maximum amplitude parameter during bit periods of the series of data frames. The adjusting is based on the discrete frequency signal and a predetermined threshold. The minimum filter circuit dynamically and selectively adjusts a minimum amplitude parameter during bit periods of the series of data frames. The adjusting is based on the discrete frequency signal and the predetermined threshold. The calculating circuit adapts the predetermined threshold for a next data frame based on the maximum amplitude parameter and the minimum amplitude parameter after a current data frame.

An example of an integrated circuit includes a threshold computation circuit with an input circuit, a maximum filter circuit, a minimum filter circuit, and a calculating circuit. The input circuit receives a discrete frequency signal from a digital filtering circuit. The discrete frequency signal is based on an S-FSK waveform received by an S-FSK receiver associated with the digital filtering circuit. The discrete frequency signal is representative of digital logic levels in a series of data frames modulated using S-FSK to form the S-FSK waveform. Each data frame including an active portion and a zero energy portion. The active portion includes at least one data word and the zero energy portion includes at least one zero energy word. Each data word and zero energy word include multiple bit periods. The maximum filter circuit dynamically and selectively adjusts a maximum amplitude parameter during bit periods of the series of data frames. The adjusting is based on the discrete frequency signal and a predetermined threshold. The minimum filter circuit dynamically and selectively adjusts a minimum amplitude parameter during bit periods of the series of data frames. The adjusting is based on the discrete frequency signal and the predetermined threshold. The calculating circuit adapts the predetermined threshold for a next data frame based on the maximum amplitude parameter and the minimum amplitude parameter after a current data frame.

An example of a method for computing a threshold to distinguish digital data signals of an S-FSK waveform receiving a discrete frequency signal from a digital filtering circuit at a threshold computation circuit. The discrete frequency signal is based on an S-FSK waveform received by an S-FSK receiver associated with the digital filtering circuit. The discrete frequency signal is representative of digital logic levels in a series of data frames modulated using S-FSK to form the S-FSK waveform. Each data frame including an active portion and a zero energy portion. The active portion includes at least one data word and the zero energy portion includes at least one zero energy word. Each data word and zero energy word include multiple bit periods. A maximum amplitude parameter is dynamically and selectively adjusted at the threshold computation circuit during bit periods of the series of data frames. The adjusting is based on the discrete frequency signal and a predetermined threshold. A minimum amplitude parameter is dynamically and selectively adjusted at the threshold computation circuit during bit periods of the series of data frames. The adjusting is based on the discrete frequency signal and the predetermined threshold.

The predetermined threshold is adapted for a next data frame based on the maximum amplitude parameter and the minimum amplitude parameter after a current data frame.

DETAILED DESCRIPTION

Figure 1:
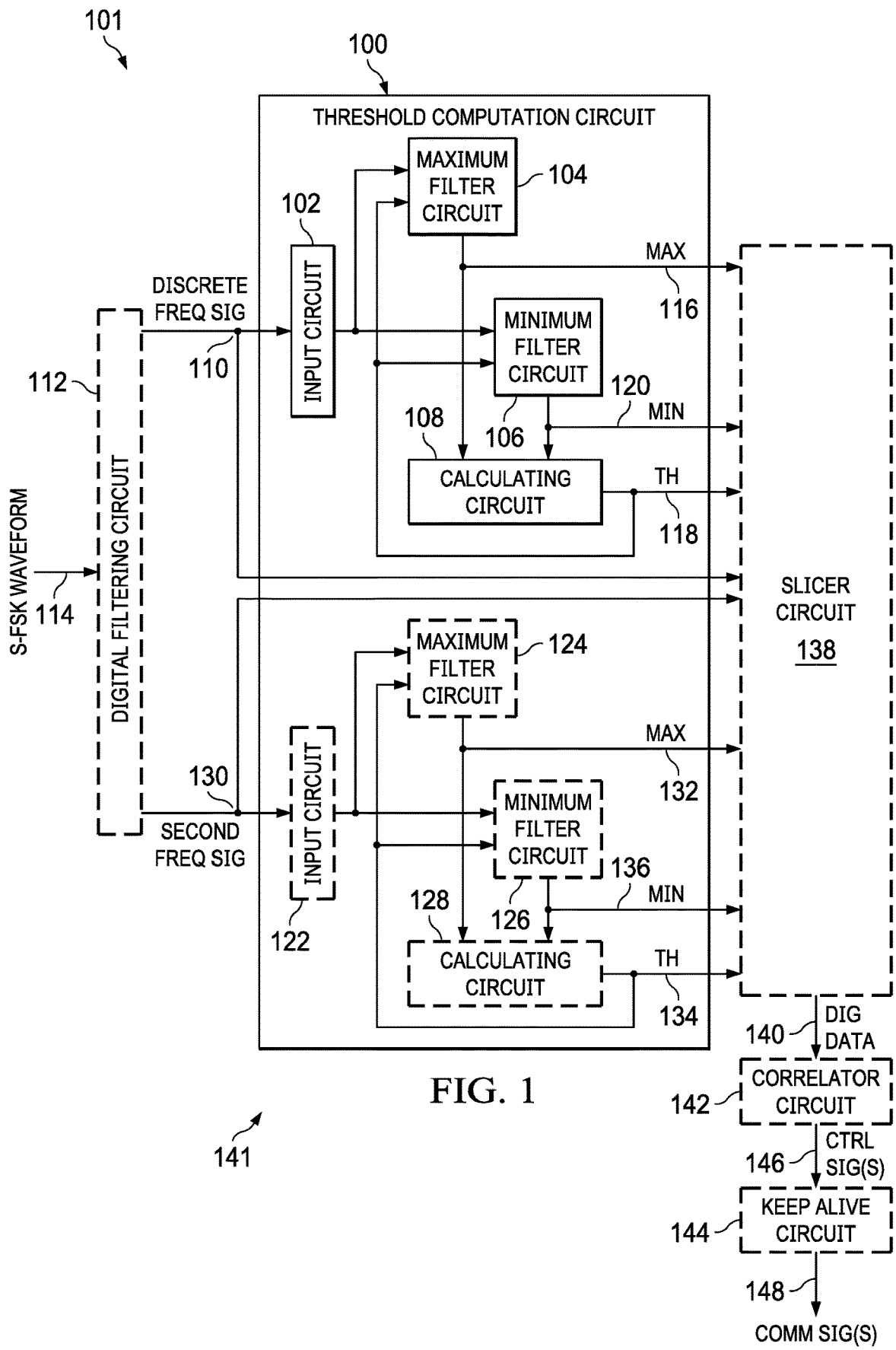
FIG. 1 is a block diagram of an example of a threshold computation circuit.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner like the term "comprising", and thus should be interpreted to mean "including, but not limited to . . . ."

With reference to FIG. 1, an example of a threshold computation circuit 100 for a spread frequency-shift keying (S-FSK) receiver 101 includes an input circuit 102, a maximum filter circuit 104, a minimum filter circuit 106, and a calculating circuit 108. The input circuit 102 is configured to receive a discrete frequency signal 110, for example, from a digital filtering circuit 112. The discrete frequency signal 110 is based on an S-FSK waveform 114 received by an S-FSK receiver 101 associated with the digital filtering circuit. The discrete frequency signal 110 is representative of digital logic levels in a series of data frames modulated using S-FSK to form the S-FSK waveform 114. Each data frame including an active portion and a zero energy portion. The active portion includes at least one data word and the zero energy portion includes at least one zero energy word. Each data word and zero energy word include multiple bit periods.

The maximum filter circuit 104 is configured to dynamically and selectively adjust a maximum amplitude parameter 116 during bit periods of the series of data frames. The adjusting is based on the discrete frequency signal 110 and a predetermined threshold 118. The minimum filter circuit 106 is configured to dynamically and selectively adjust a minimum amplitude parameter 120 during bit periods of the series of data frames. The adjusting is based on the discrete frequency signal 110 and the predetermined threshold 118. The calculating circuit 108 is configured to adapt the predetermined threshold 118 for a next data frame based on the maximum amplitude parameter 116 and the minimum amplitude parameter 120 after a current data frame.

In another example of the threshold computation circuit 100, the discrete frequency signal 110 is a "mark" frequency signal with bit periods representative of "ON" logic levels. In yet another example, the active portions of the data frames include three data words, each data word including 11 bit periods. In still another example, the zero energy portions of the data frames include 16 zero energy words, each zero energy word including 11 bit periods. In still yet another example, each data frame includes 109 bit periods.

In another example of the threshold computation circuit 100, the active portions of the data frames include three consecutive data words representative of code word triplets in accordance with SunSpec Interoperability Specification, Communication Signal for Rapid Shutdown. In this example, the zero energy portions of the data frames include 16 consecutive zero energy words with null values representative of zero energy in accordance with SunSpec Interoperability Specification, Communication Signal for Rapid Shutdown.

In yet another example of the threshold computation circuit 100, the maximum filter circuit 104 is configured to: i) determine if the discrete frequency signal 110 is greater than the predetermined threshold 118 during each bit period of the series of data frames, ii) modify the maximum amplitude parameter 116 during each bit period of the current data frame in which the discrete frequency signal 110 is greater than the predetermined threshold 118 to form a next maximum amplitude parameter 116' for the next data frame, iii) count each bit period of the current data frame, and iv) change the maximum amplitude parameter 116 to be equivalent to the next maximum amplitude parameter 116' after counting the bit periods of the current data frame.

In a further example of the threshold computation circuit 100, the maximum filter circuit 104 is configured to modify the maximum amplitude parameter 116 in accordance with the following equation:

$$\text{max amp } param\,(i+1) = \frac{\text{discrete } freq\text{ sig}(i)}{m} + \left(1 - \frac{1}{m}\right)\text{max amp } param(i)$$

where i is a current bit period, max amp param (i+1) is the next maximum amplitude parameter 116' for a next bit period, discrete freq sig (i) is the discrete frequency signal 110 for the current bit period, m is less than two times an expected number of bit periods per data frame with "ON" logic levels, and max amp param (i) is the maximum amplitude parameter 116 for the current bit period.

In another further example of the threshold computation circuit 100, the maximum filter circuit 104 is configured to change the maximum amplitude parameter 116 in accordance with the following equation:

$$\text{max amp } param(i+1) = \text{max amp } param$$

where i is a current bit period, max amp param (i+1) is the next maximum amplitude parameter 116' for a next bit period, and max amp param is the maximum amplitude parameter 116 to be used for the next data frame.

In still another example of the threshold computation circuit 100, the minimum filter circuit 106 is configured to: i) determine if the discrete frequency signal 110 is less than the predetermined threshold 118 during each bit period of the series of data frames, ii) modify the minimum amplitude parameter 120 during each bit period of the current data frame in which the discrete frequency signal 110 is less than the predetermined threshold 118 to form a next minimum amplitude parameter 120' for the next data frame, iii) count each bit period of the current data frame, and iv) change the minimum amplitude parameter 120 to be equivalent to the next minimum amplitude parameter 120' after counting the bit periods of the current data frame.

In a further example of the threshold computation circuit 100, the minimum filter circuit 106 is configured to modify the minimum amplitude parameter 120 in accordance with the following equation:

$$\text{min amp } param\,(i+1) = \frac{\text{discrete } freq\text{ sig}(i)}{m} + \left(1 - \frac{1}{m}\right)\text{min amp } param(i)$$

where i is a current bit period, min amp param (i+1) is the next minimum amplitude parameter 120' for a next bit period, discrete freq sig(i) is the discrete frequency signal 110 for the current bit period, m is less than two times an expected number of bit periods per data frame with "ON" logic levels, and min amp param (i) is the minimum amplitude parameter 120 for the current bit period.

In another further example of the threshold computation circuit 100, the minimum filter circuit 106 is configured to change the minimum amplitude parameter 120 in accordance with the following equation:

min amp param (i+1)=min amp param where i is a current bit period, min amp param (i+1) is the next minimum amplitude parameter 120' for a next bit period, and min amp param is the minimum amplitude parameter 120 to be used for the next data frame.

In still yet another example of the threshold computation circuit 100, the calculating circuit 108 is configured to: i) calculate an updated threshold value for the predetermined threshold 118 based on the maximum and minimum amplitude parameters 116, 120 after the current data frame, and ii) modify the predetermined threshold 118 for the next data frame based on the updated threshold value.

In a further example of the threshold computation circuit 100, the calculating circuit 108 is configured to calculate the updated threshold value in accordance with the following equation:

$$\text{updated thresh } val = \frac{\text{max amp } param + \text{min amp } param}{2}$$

where updated thresh val is the updated threshold value calculated after the current data frame, max amp param is the maximum amplitude parameter 116 after the current data frame, and min amp param is the minimum amplitude parameter 120 after the current data frame.

In another further example of the threshold computation circuit 100, the calculating circuit 108 is configured to modify the predetermined threshold 118 in accordance with the following equation:

updated thresh val=predetermined thresh where updated thresh val is the updated threshold value calculated after the current data frame and predetermined thresh is the predetermined threshold 118 to be used for the next data frame.

In another example, the threshold computation circuit 100 also includes a second input circuit 122, a second maximum filter circuit 124, a second minimum filter circuit 126, and a second calculating circuit 128. The second input circuit 122 is configured to receive a second frequency signal 130 from the digital filtering circuit 112. The second frequency signal 130 is based on the S-FSK waveform 114 received by the S-FSK receiver 101. The second frequency signal 130 is representative of second digital logic levels in the series of data frames modulated using S-FSK to form the S-FSK waveform 114.

The second maximum filter circuit 124 is configured to dynamically and selectively adjust a second maximum amplitude parameter 132 during bit periods of the series of data frames. The adjusting is based on the second frequency signal 130 and a second predetermined threshold 134. The second minimum filter circuit 126 is configured to dynamically and selectively adjust a second minimum amplitude parameter 136 during bit periods of the series of data frames. The adjusting is based on the second frequency signal 130 and the second predetermined threshold 134. The second calculating circuit 128 is configured to adapt the second predetermined threshold 134 for the next data frame based on the second maximum amplitude parameter 132 and the second minimum amplitude parameter 136 after the current data frame.

In a further example of the threshold computation circuit 100, the second frequency signal 130 is a "space" frequency signal with bit periods representative of "OFF" logic levels.

In another further example of the threshold computation circuit 100, the second maximum filter circuit 124 is configured to: i) determine if the second frequency signal 130 is greater than the second predetermined threshold 134 during each bit period of the series of data frames, ii) modify the second maximum amplitude parameter 132 during each bit period of the current data frame in which the second frequency signal 130 is greater than the second predetermined threshold 134 to form a next second maximum amplitude parameter 132' for the next data frame, iii) count each bit period of the current data frame, and iv) change the second maximum amplitude parameter 132 to be equivalent to the next second maximum amplitude parameter 132' after counting the bit periods of the current data frame.

In yet another further example of the threshold computation circuit 100, the second minimum filter circuit 126 is configured to: i) determine if the second frequency signal 130 is less than the second predetermined threshold 134 during each bit period of the series of data frames, ii) modify the second minimum amplitude parameter 136 during each bit period of the current data frame in which the second frequency signal 130 is less than the second predetermined threshold 134 to form a next second minimum amplitude parameter 136' for the next data frame, iii) count each bit period of the current data frame, and iv) change the second minimum amplitude parameter 136 to be equivalent to the next second minimum amplitude parameter 136' after counting the bit periods of the current data frame.

In still another further example of the threshold computation circuit 100, the second calculating circuit 128 is configured to: i) calculate an updated second threshold value for the second predetermined threshold 134 based on the second maximum and second minimum amplitude parameters 132, 136 after the current data frame, and ii) modify the second predetermined threshold 134 for the next data frame based on the updated second threshold value.

With continued reference to FIG. 1, an example of the S-FSK receiver 101 includes the digital filtering circuit 112, threshold computation circuit 100, and a slicer circuit 138. The digital filtering circuit 112 may be configured to receive the S-FSK waveform 114, process the S-FSK waveform 114 to create the discrete and second frequency signals 110, 130, and provide the discrete and second frequency signals 110, 130 to the threshold computation circuit 100. Various examples of the threshold computation circuit 100 are described above. The slicer circuit 138, for example, is configured to receive the discrete and second frequency signals 110, 130 from the digital filtering circuit 112, receive the maximum amplitude parameter 116, minimum amplitude parameter 120, predetermined threshold 118, second maximum amplitude parameter 132, second minimum amplitude parameter 136, and second predetermined threshold 134 from the threshold computation circuit 100, generate a digital data stream 140 based on the received signals, parameters, and thresholds, and output the digital data stream 140. The digital data stream 140, for example, is representative of at least one of the digital logic levels and second digital logic levels in the series of data frames modulated using S-FSK to form the S-FSK waveform 114.

With further reference to FIG. 1, an example of a photovoltaic (PV) array rapid shutdown control circuit 141 includes the digital filtering circuit 112, threshold computation circuit 100, slicer circuit 138, a correlator circuit 142, and a keep alive circuit 144. Various examples of the digital filtering circuit 112, threshold computation circuit 100, and slicer circuit 138 are described above. The correlator circuit 142, for example, is configured to receive the digital data stream 140 from the slicer circuit 138, decode the digital data stream 140 into code words, correlate the code words based on a predetermined protocol, and generate one or more intermediate control signals 146 based on the code words and the predetermined protocol. The keep alive circuit 144, for example, is configured to receive the one or more intermediate control signals 146 from the correlator circuit 142, process the one or more intermediate control signals 146 to generate one or more communication signals 148, and output the one or more communication signals 148. The one or more communication signals 148, for example, may be used to communicate with a PV system to support rapid shutdown of one or more PV array in the PV system.

Figure 2:
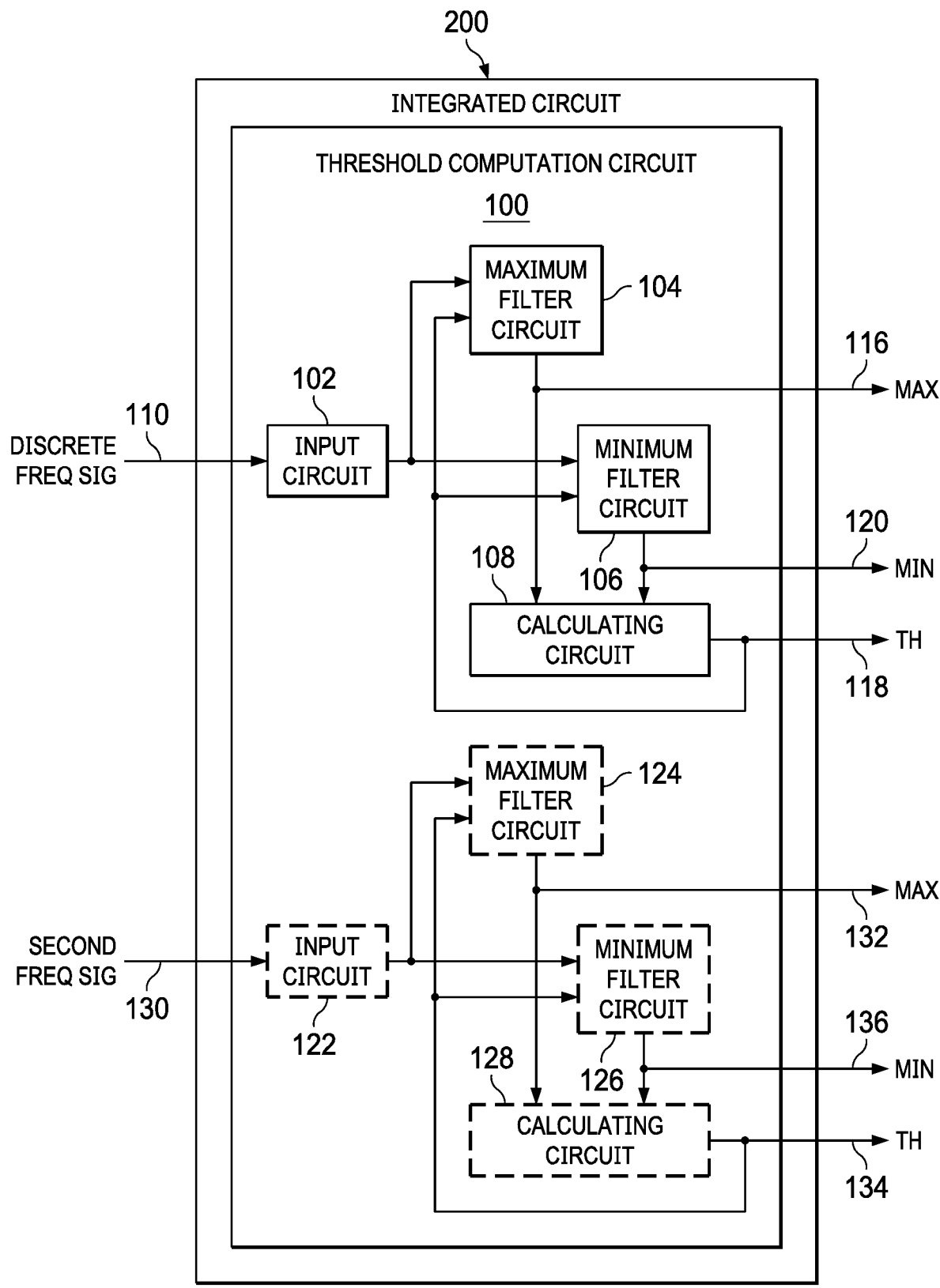
FIG. 2 is a block diagram of an example of an integrated circuit that includes a threshold computation circuit.

With reference to FIG. 2, an example of an integrated circuit 200 includes a threshold computation circuit 100 (also see FIG. 1). The threshold computation circuit 100 including an input circuit 102, a maximum filter circuit 104, a minimum filter circuit 106, and a calculating circuit 108. The input circuit 102 is configured to receive a discrete frequency signal 110, for example, from a digital filtering circuit 112 (see FIG. 1). The discrete frequency signal 110 is based on an S-FSK waveform 114 (see FIG. 1) received by an S-FSK receiver 101 (see FIG. 1) associated with the digital filtering circuit 112. The discrete frequency signal 110 is representative of digital logic levels in a series of data frames modulated using S-FSK to form the S-FSK waveform 114. Each data frame including an active portion and a zero energy portion. The active portion includes at least one data word and the zero energy portion includes at least one zero energy word. Each data word and zero energy word include multiple bit periods.

The maximum filter circuit 104 is configured to dynamically and selectively adjust a maximum amplitude parameter 116 during bit periods of the series of data frames. The adjusting is based on the discrete frequency signal 110 and a predetermined threshold 134. The minimum filter circuit 106 is configured to dynamically and selectively adjust a minimum amplitude parameter 120 during bit periods of the series of data frames. The adjusting is based on the discrete frequency signal 110 and the predetermined threshold 118. The calculating circuit 108 is configured to adapt the predetermined threshold 118 for a next data frame based on the maximum amplitude parameter 116 and the minimum amplitude parameter 120 after a current data frame.

In another example of the integrated circuit 200, the maximum filter circuit 104 is configured to: i) determine if the discrete frequency signal 110 is greater than the predetermined threshold 118 during each bit period of the series of data frames, ii) modify the maximum amplitude parameter 116 during each bit period of the current data frame in which the discrete frequency signal 110 is greater than the predetermined threshold 118 to form a next maximum amplitude parameter 116' for the next data frame, iii) count each bit period of the current data frame, and iv) change the maximum amplitude parameter 116 to be equivalent to the next maximum amplitude parameter 116' after counting the bit periods of the current data frame.

In yet another example of the integrated circuit 200, the minimum filter circuit 106 is configured to: i) determine if the discrete frequency signal 110 is less than the predetermined threshold 118 during each bit period of the series of data frames, ii) modify the minimum amplitude parameter 120 during each bit period of the current data frame in which the discrete frequency signal 110 is less than the predetermined threshold 118 to form a next minimum amplitude parameter 120' for the next data frame, iii) count each bit period of the current data frame, and iv) change the minimum amplitude parameter 120 to be equivalent to the next minimum amplitude parameter 120' after counting the bit periods of the current data frame.

In still another example of the integrated circuit 200, the calculating circuit 108 is configured to: i) calculate an updated threshold value for the predetermined threshold 118 based on the maximum and minimum amplitude parameters 116, 120 after the current data frame, and ii) modify the predetermined threshold 118 for the next data frame based on the updated threshold value.

In still yet another example of the integrated circuit 200, the threshold computation circuit 100 also includes a second input circuit 122, a second maximum filter circuit 124, a second minimum filter circuit 126, and a second calculating circuit 128. The second input circuit 122 is configured to receive a second frequency signal 130, for example, from the digital filtering circuit 112. The second frequency signal 130 is based on the S-FSK waveform 114 received by the S-FSK receiver 101. The second frequency signal 130 is representative of second digital logic levels in the series of data frames modulated using S-FSK to form the S-FSK waveform 114.

The second maximum filter circuit 124 is configured to dynamically and selectively adjust a second maximum amplitude parameter 132 during bit periods of the series of data frames. The adjusting is based on the second frequency signal 130 and a second predetermined threshold 134. The second minimum filter circuit 126 is configured to dynamically and selectively adjust a second minimum amplitude parameter 136 during bit periods of the series of data frames. The adjusting is based on the second frequency signal 130 and the second predetermined threshold 134. The second calculating circuit 128 is configured to adapt the second predetermined threshold 134 for the next data frame based on the second maximum amplitude parameter 132 and the second minimum amplitude parameter 136 after the current data frame.

In a further example of the integrated circuit 200, the second maximum filter circuit 124 is configured to: i) determine if the second frequency signal 130 is greater than the second predetermined threshold 134 during each bit period of the series of data frames, ii) modify the second maximum amplitude parameter 132 during each bit period of the current data frame in which the second frequency signal 130 is greater than the second predetermined threshold 134 to form a next second maximum amplitude parameter 132' for the next data frame, iii) count each bit period of the current data frame, and iv) change the second maximum amplitude parameter 132 to be equivalent to the next second maximum amplitude parameter 132' after counting the bit periods of the current data frame.

In another further example of the integrated circuit 200, the second minimum filter circuit 126 is configured to: i) determine if the second frequency signal 130 is less than the second predetermined threshold 134 during each bit period of the series of data frames, ii) modify the second minimum amplitude parameter 136 during each bit period of the current data frame in which the second frequency signal 130 is less than the second predetermined threshold 134 to form a next second minimum amplitude parameter 136' for the next data frame, iii) count each bit period of the current data frame, and iv) change the second minimum amplitude parameter 136 to be equivalent to the next second minimum amplitude parameter 136' after counting the bit periods of the current data frame.

In yet another further example of the integrated circuit 200, the second calculating circuit 128 is configured to: i) calculate an updated second threshold value for the second predetermined threshold 134 based on the second maximum and second minimum amplitude parameters 132, 136 after the current data frame, and ii) modify the second predetermined threshold 134 for the next data frame based on the updated second threshold value.

Figure 3:
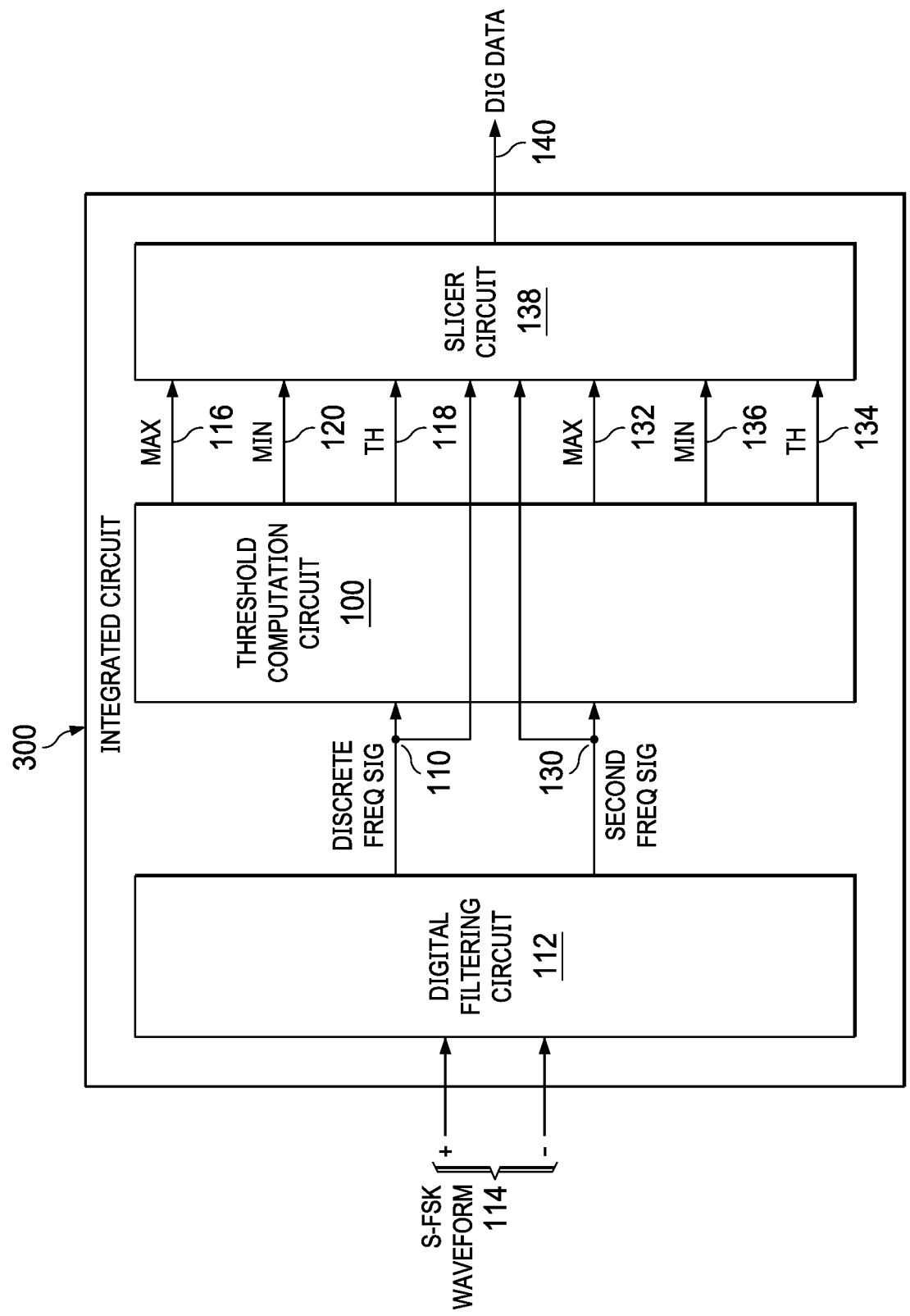
FIG. 3 is a block diagram of an example of an integrated circuit that includes an S-FSK receiver.

With reference to FIG. 3, another example of an integrated circuit 300 includes a digital filtering circuit 112, a threshold computation circuit 100, and a slicer circuit 138. The digital filtering circuit 112 is configured to receive the S-FSK waveform 114 via positive (+) and negative (−) input terminals, process the S-FSK waveform 114 to create the discrete and second frequency signals 110, 130, and provide the discrete and second frequency signals 110, 130 to the threshold computation circuit 100. Various examples of the threshold computation circuit 100 are described above in reference to FIG. 1. The slicer circuit 138 is configured to receive the discrete and second frequency signals 110, 130 from the digital filtering circuit 112, receive the maximum amplitude parameter 116, minimum amplitude parameter 120, predetermined threshold 118, second maximum amplitude parameter 132, second minimum amplitude parameter 136, and second predetermined threshold 134 from the threshold computation circuit 100, generate a digital data stream 140 based on the received signals, parameters, and thresholds, and provide the digital data stream 140 at an output terminal. The digital data stream 140, for example, is representative of at least one of the digital logic levels and second digital logic levels in the series of data frames modulated using S-FSK to form the S-FSK waveform 114.

Figure 4:
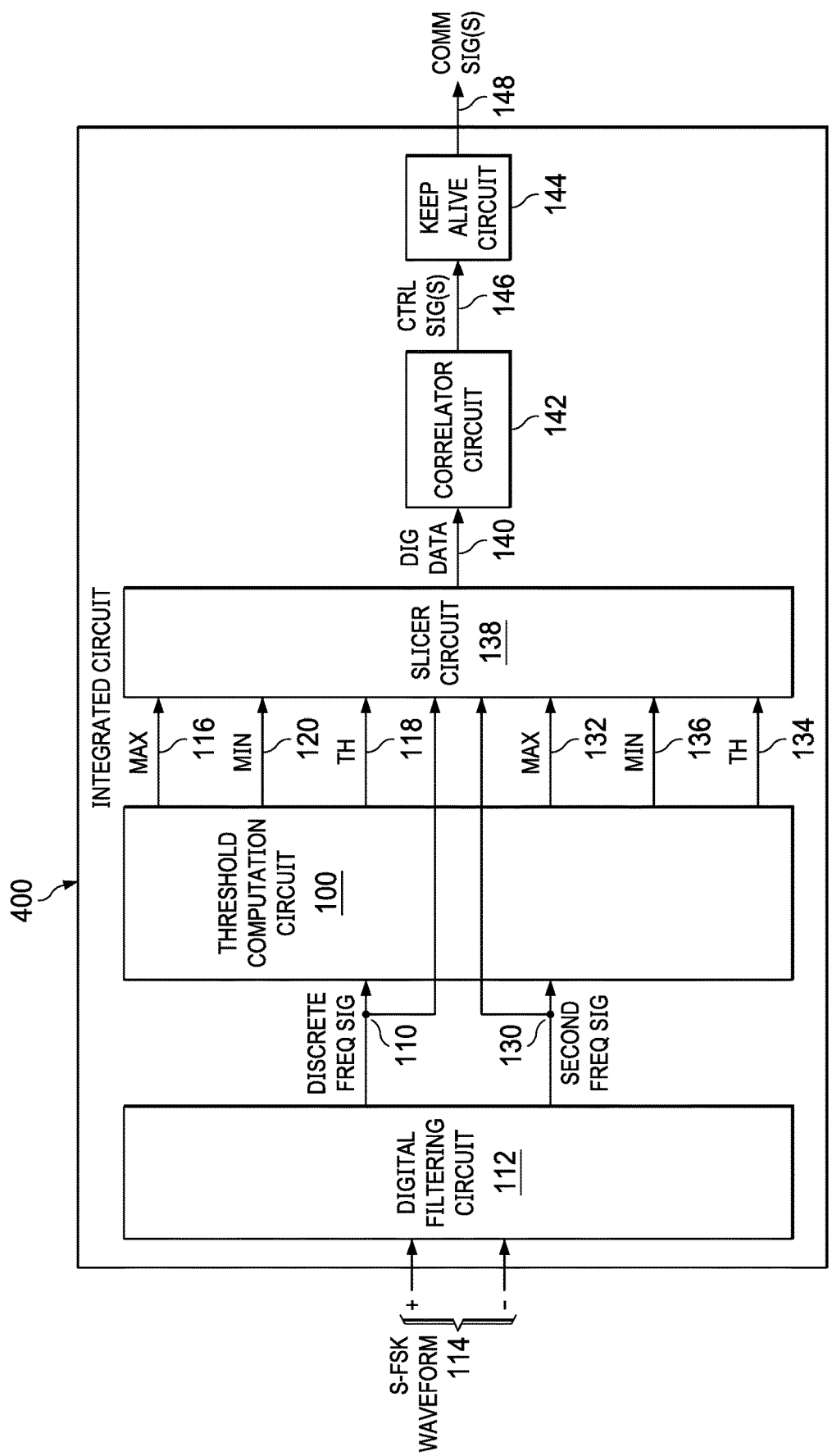
FIG. 4 is a block diagram of an example of an integrated circuit that includes a photovoltaic (PV) array rapid shutdown control circuit.

With reference to FIG. 4, yet another example of an integrated circuit 400 includes a digital filtering circuit 112, a threshold computation circuit 100, a slicer circuit 138, a correlator circuit 142, and a keep alive circuit 144. Various examples of the digital filtering circuit 112 are described above in reference to FIG. 3. Various examples of the threshold computation circuit 100 are described above in reference to FIG. 1. Various examples of the slicer circuit 138 are described above in reference to FIG. 3. The correlator circuit 142 is configured to receive the digital data stream 140 from the slicer circuit 138, decode the digital data stream 140 into code words, correlate the code words based on a predetermined protocol, and generate one or more intermediate control signals 146 based on the code words and the predetermined protocol. The keep alive circuit 144 is configured to receive the one or more intermediate control signals 146 from the correlator circuit 142, process the one or more intermediate control signals 146 to generate one or more communication signals 148, and provide the one or more communication signals 148 at an output terminal. The one or more communication signals 148, for example, may be used to communicate with a PV system to support rapid shutdown of one or more PV array in the PV system.

Figure 5:
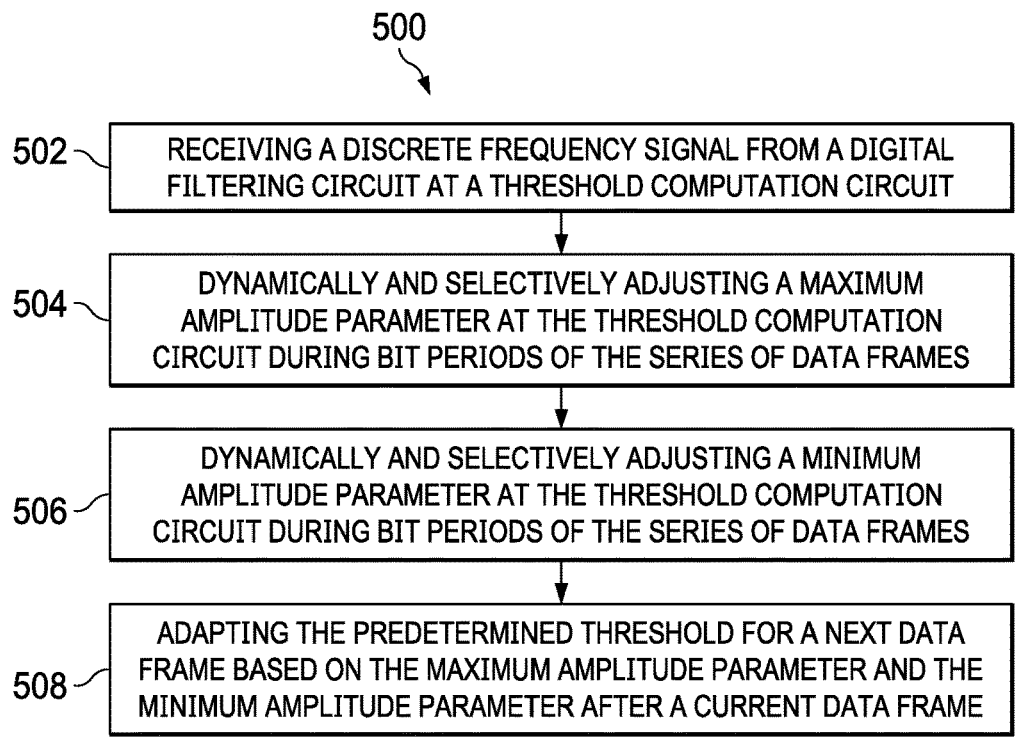
FIG. 5 is a flow chart of an example of a process for computing a threshold to distinguish digital data signals of an S-FSK waveform.

With reference to FIG. 5, an example of a process 500 for computing a threshold to distinguish digital data signals of an S-FSK waveform begins at 502 where a discrete frequency signal is received from a digital filtering circuit at a threshold computation circuit. The discrete frequency signal is based on an S-FSK waveform received by a S-FSK receiver associated with the digital filtering circuit. The discrete frequency signal is representative of digital logic levels in a series of data frames modulated using S-FSK to form the S-FSK waveform. Each data frame including an active portion and a zero energy portion. The active portion includes at least one data word and the zero energy portion includes at least one zero energy word. Each data word and zero energy word include multiple bit periods. At 504, a maximum amplitude parameter is dynamically and selectively adjusted at the threshold computation circuit during bit periods of the series of data frames. The adjusting is based on the discrete frequency signal and a predetermined threshold. Next, a minimum amplitude parameter is dynamically and selectively adjusted at the threshold computation circuit during bit periods of the series of data frames (506). The adjusting is based on the discrete frequency signal and the predetermined threshold. At 508, the predetermined threshold is adapted for a next data frame based on the maximum amplitude parameter and the minimum amplitude parameter after a current data frame. In another example of the process 500, the discrete frequency signal is a "mark" frequency signal with bit periods representative of "ON" logic levels.

Figure 6:
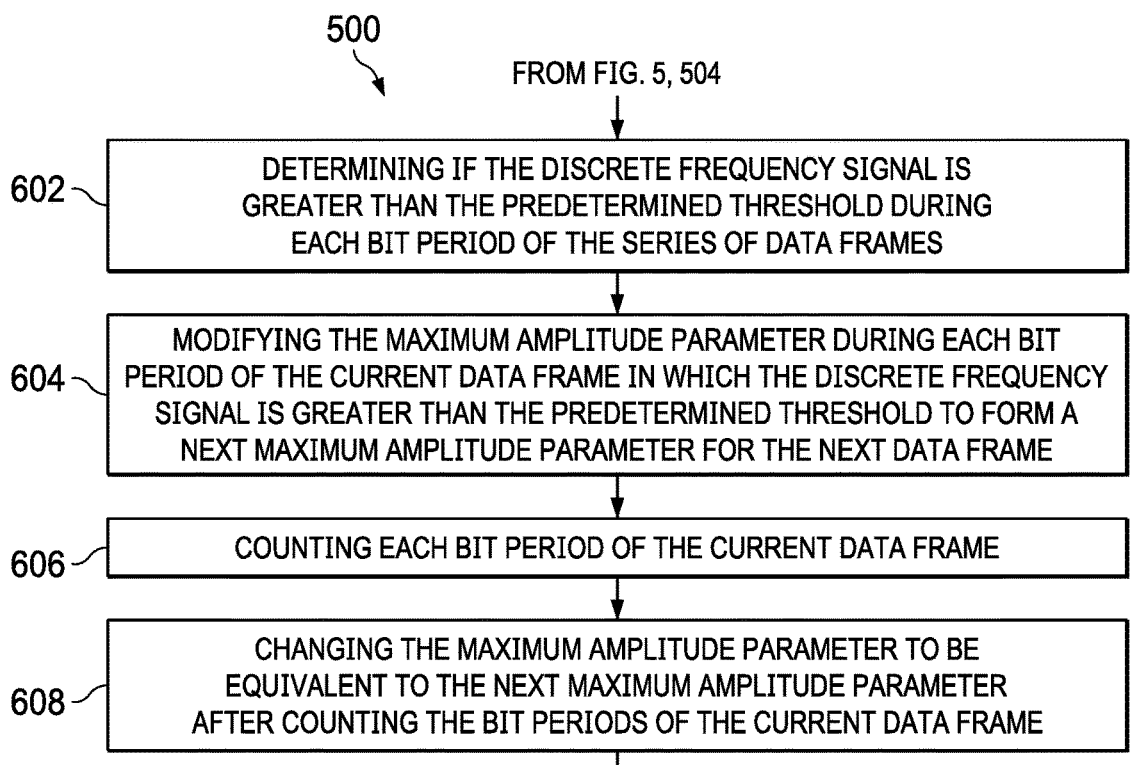
FIG. 6, in combination with FIG. 5, is a flow chart of another example of a process for computing a threshold to distinguish digital data signals of an S-FSK waveform.

With reference to FIG. 6, another example of the process 500 for computing a threshold to distinguish digital data signals of an S-FSK waveform of FIG. 5. The example in FIG. 6 includes additional features with respect to adjusting the maximum amplitude parameter at 504 in FIG. 5. In this example, adjusting the maximum amplitude parameter includes determining if the discrete frequency signal is greater than the predetermined threshold during each bit period of the series of data frames at 602. At 604, the maximum amplitude parameter is modified during each bit period of the current data frame in which the discrete frequency signal is greater than the predetermined threshold to form a next maximum amplitude parameter for the next data frame. Each bit period of the current data frame is counted at 606. At 608, the maximum amplitude parameter is changed to be equivalent to the next maximum amplitude parameter after counting the bit periods of the current data frame.

In yet another example of the process 500, the maximum amplitude parameter is modified in accordance with the following equation:

$$\text{max amp } param\ (i+1) = \frac{\text{discrete } freq\ \text{sig}(i)}{m} + \left(1 - \frac{1}{m}\right)\text{max amp } param(i)$$

where i is a current bit period, max amp param (i+1) is the next maximum amplitude parameter for a next bit period, discrete freq sig(i) is the discrete frequency signal for the current bit period, m is less than two times an expected number of bit periods per data frame with "ON" logic levels, and max amp param (i) is the maximum amplitude parameter for the current bit period.

In still another example of the process 500, the maximum amplitude parameter is changed in accordance with the following equation:

$$\text{max amp param}(i+1) = \text{max amp param}$$

where i is a current bit period, max amp param (i+1) is the next maximum amplitude parameter for a next bit period, and max amp param is the maximum amplitude parameter to be used for the next data frame.

Figure 7:
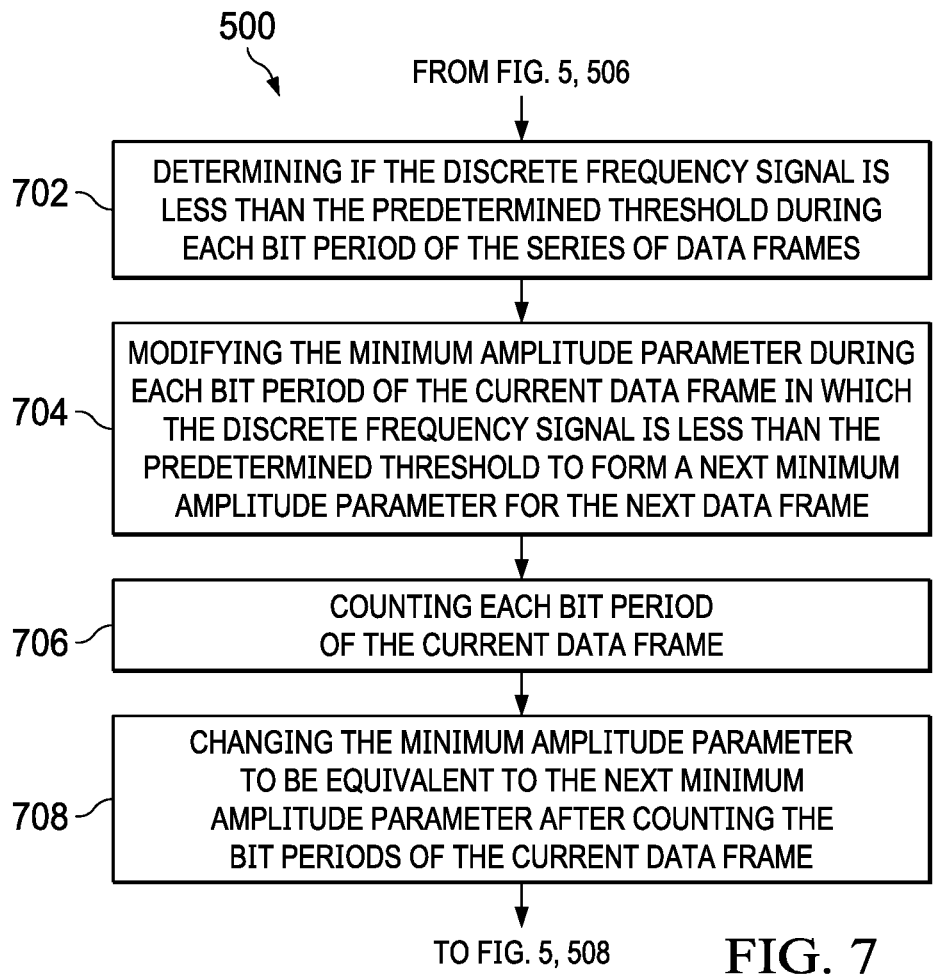
FIG. 7, in combination with FIG. 5, is a flow chart of yet another example of a process for computing a threshold to distinguish digital data signals of an S-FSK waveform.

FIG. 7 shows another example of the process 500 of FIG. 5. This example includes additional features with respect to adjusting the minimum amplitude parameter at 506 in FIG. 5. In this example, adjusting the minimum amplitude parameter includes determining if the discrete frequency signal is less than the predetermined threshold during each bit period of the series of data frames at 702. At 704, the minimum amplitude parameter is modified during each bit period of the current data frame in which the discrete frequency signal is less than the predetermined threshold to form a next minimum amplitude parameter for the next data frame. Each bit period of the current data frame is counted at 706. At 708, the minimum amplitude parameter is changed to be equivalent to the next minimum amplitude parameter after counting the bit periods of the current data frame.

In still another example of the process 500, the minimum amplitude parameter is modified in accordance with the following equation:

$$\text{min amp } param\ (i+1) = \frac{\text{discrete } freq\ \text{sig}(i)}{m} + \left(1 - \frac{1}{m}\right)\text{min amp } param(i)$$

where i is a current bit period, min amp param (i+1) is the next minimum amplitude parameter for a next bit period, discrete freq sig(i) is the discrete frequency signal for the current bit period, m is less than two times an expected number of bit periods per data frame with "ON" logic levels, and min amp param (i) is the minimum amplitude parameter for the current bit period.

FIG. 7 shows another example of the process 500, in which the minimum amplitude parameter is changed in accordance with the following equation:

$$\text{min amp param}(i+1) = \text{min amp param}$$

where i is a current bit period, min amp param (i+1) is the next minimum amplitude parameter for a next bit period, and min amp param is the minimum amplitude parameter to be used for the next data frame.

Figure 8:
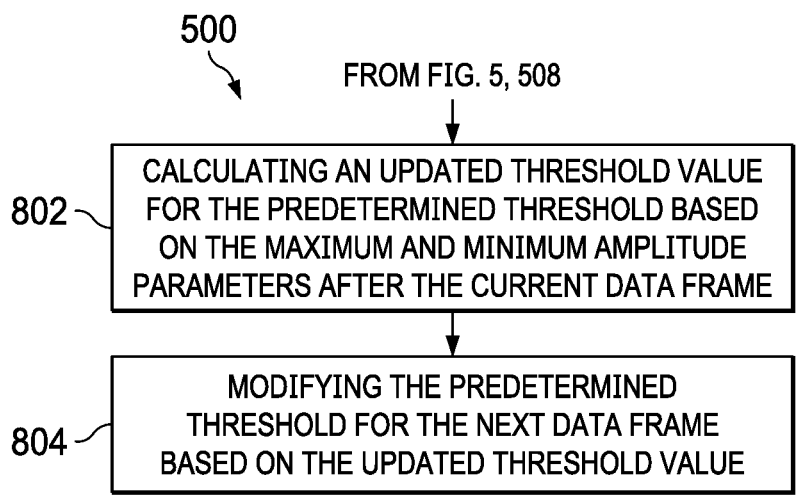
FIG. 8, in combination with FIG. 5, is a flow chart of still another example of a process for computing a threshold to distinguish digital data signals of an S-FSK waveform.

FIG. 8 shows another example of the process 500 of FIG. 5. This example includes additional features with respect to adapting of the predetermined threshold of FIG. 5. In this example, adapting the predetermined threshold includes calculating an updated threshold value for the predetermined threshold based on the maximum and minimum amplitude parameters after the current data frame at 802. At 804, the predetermined threshold for the next data frame is modified based on the updated threshold value.

In still yet another example of the process 500, the updated threshold value is calculated in accordance with the following equation:

$$\text{updated thresh } val = \frac{\text{max amp } param + \text{min amp } param}{2}$$

where updated thresh val is the updated threshold value calculated after the current data frame, max amp param is the maximum amplitude parameter after the current data frame, and min amp param is the minimum amplitude parameter after the current data frame.

In another example of the process 800, the predetermined threshold is modified in accordance with the following equation:

$$\text{updated thresh val} = \text{predetermined thresh}$$

where updated thresh val is the updated threshold value calculated after the current data frame and predetermined thresh is the predetermined threshold to be used for the next data frame.

Figure 9:
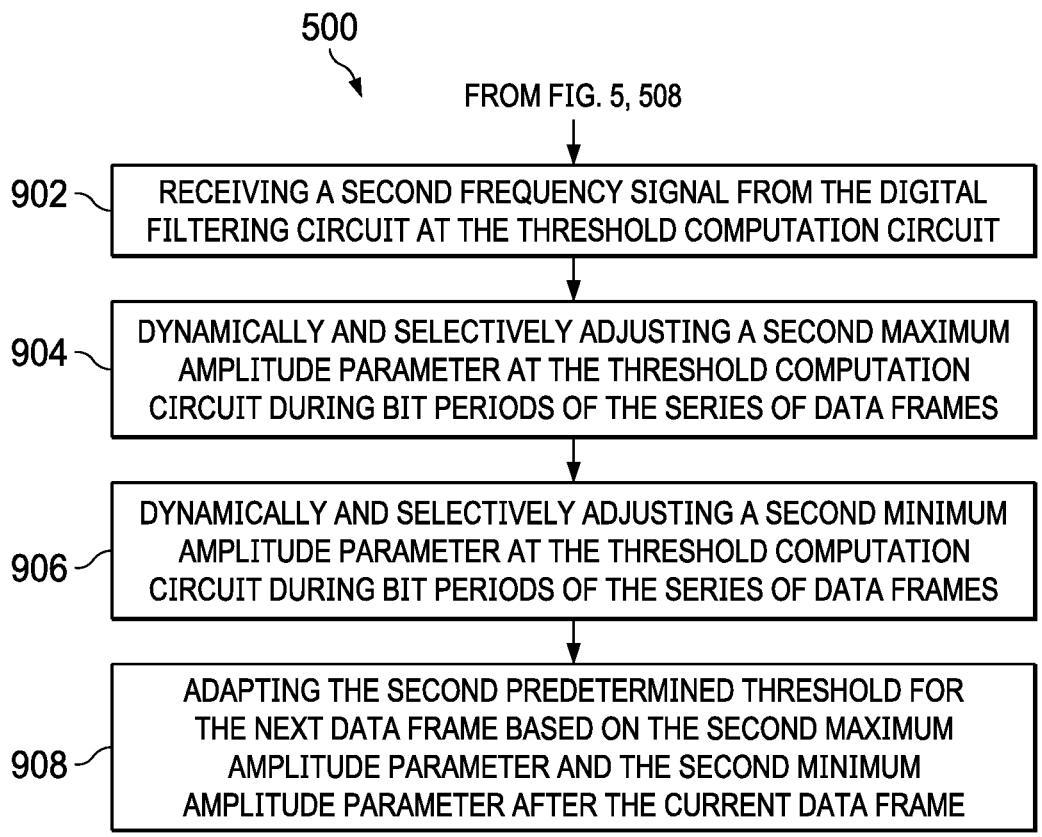
FIG. 9, in combination with FIG. 5, is a flow chart of still yet another example of a process for computing a threshold to distinguish digital data signals of an S-FSK waveform.
Figure 10:
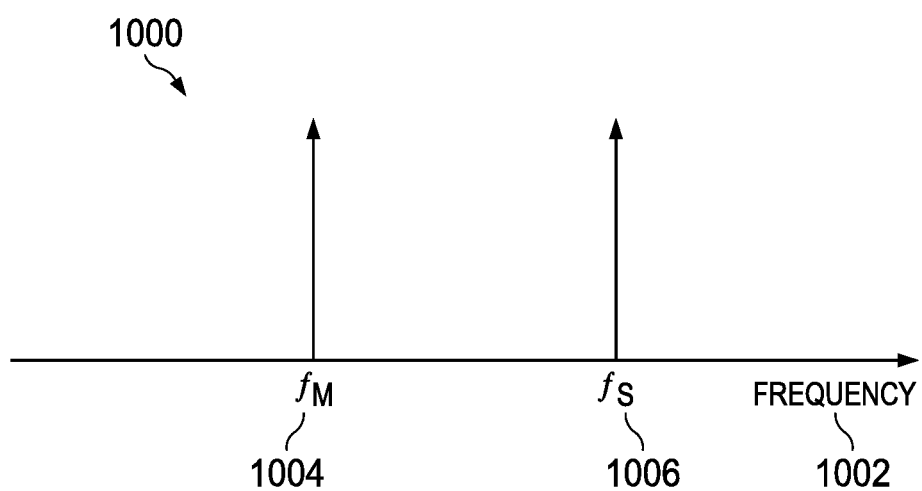
FIG. 10 is a frequency spectrum diagram showing "mark" ($f_M$) and "space" ($f_S$) frequencies.

FIG. 9 shows another example of the process 500 of FIG. 5, which continues at 902 from adapting of the predetermined threshold at 508 in FIG. 5, where a second frequency signal is received from the digital filtering circuit at the threshold computation circuit. The second frequency signal is based on the S-FSK waveform received by the S-FSK receiver. The second frequency signal is representative of second digital logic levels in the series of data frames modulated using S-FSK to form the S-FSK waveform. At 904, a second maximum amplitude parameter is dynamically and selectively adjusted at the threshold computation circuit during bit periods of the series of data frames. The adjusting is based on the second frequency signal and a second predetermined threshold. A second minimum amplitude parameter is dynamically and selectively adjusted at the threshold computation circuit during bit periods of the series of data frames at 906. The adjusting is based on the second frequency signal and the second predetermined threshold. At 908, the second predetermined threshold is adapted for the next data frame based on the second maximum amplitude parameter and the second minimum amplitude parameter after the current data frame. In still yet another example of the process 900, the second frequency signal is a "space" frequency signal with bit periods representative of "OFF" logic levels.

In another example of the process 500, adjusting of the second maximum amplitude parameter at 904 includes: i) determining if the second frequency signal is greater than the second predetermined threshold during each bit period of the series of data frames, ii) modifying the second maximum amplitude parameter during each bit period of the current data frame in which the second frequency signal is greater than the second predetermined threshold to form a next second maximum amplitude parameter for the next data frame, iii) counting each bit period of the current data frame, and iv) changing the second maximum amplitude parameter to be equivalent to the next second maximum amplitude parameter after counting the bit periods of the current data frame.

In yet another example of the process 500, adjusting of the second minimum amplitude parameter at 906 includes: i) determining if the second frequency signal is less than the second predetermined threshold during each bit period of the series of data frames, ii) modifying the second minimum amplitude parameter during each bit period of the current data frame in which the second frequency signal is less than the second predetermined threshold to form a next second minimum amplitude parameter for the next data frame, iii) counting each bit period of the current data frame, and iv) changing the second minimum amplitude parameter to be equivalent to the next second minimum amplitude parameter after counting the bit periods of the current data frame.

In still another example of the process 500, adapting the second predetermined threshold at 908 includes: i) calculating an updated second threshold value for the second predetermined threshold based on the second maximum and second minimum amplitude parameters after the current data frame and ii) modifying the second predetermined threshold for the next data frame based on the updated second threshold value.

SunSpec Interoperability Specification, Communication Signal for Rapid Shutdown, Version 34, requires monitoring both the "mark" and "space" frequency signals to keep track of signal quality. For example, SINR=avg. ("ON" power)– avg. ("OFF" power). The Specification also requires using a "quality threshold" that governs demodulation behavior and establishing the threshold (T) based on current SINR in order to decide the values of digital data bits. For example, T=½*[avg. ("ON" power)+avg. ("OFF" power)] is used to establish a threshold between the "ON" and "OFF" values. The Specification also requires a zero-energy period which can be considered in determining the SINR and threshold (T)

Figure 12:
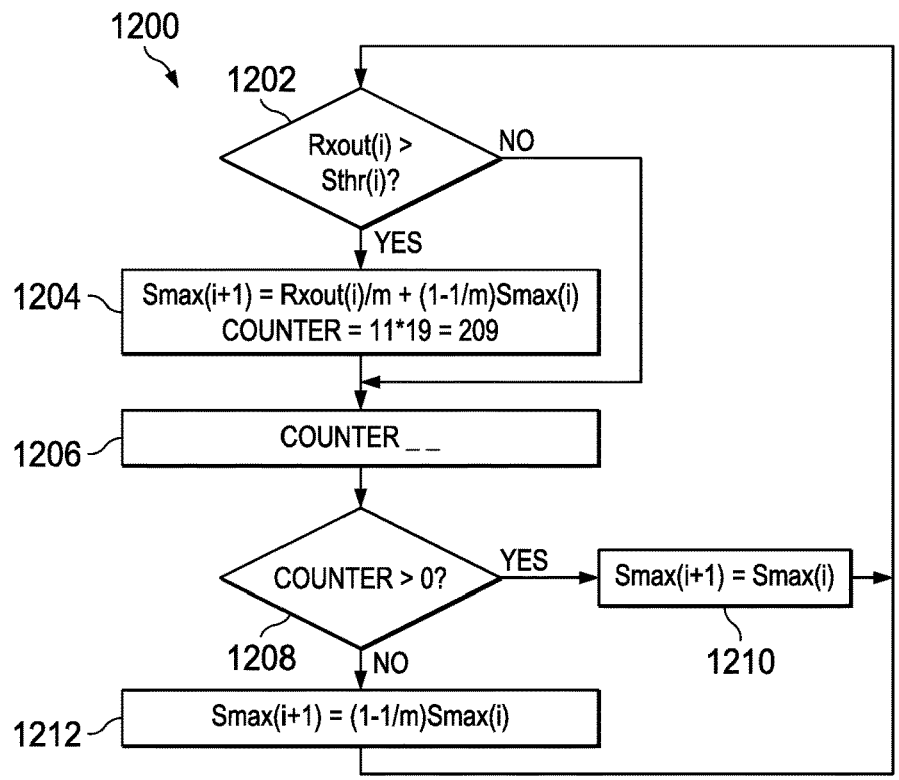
FIG. 12 is a flow chart of an example of a process for computing a maximum parameter for an S-FSK frequency signal.
Figure 13:
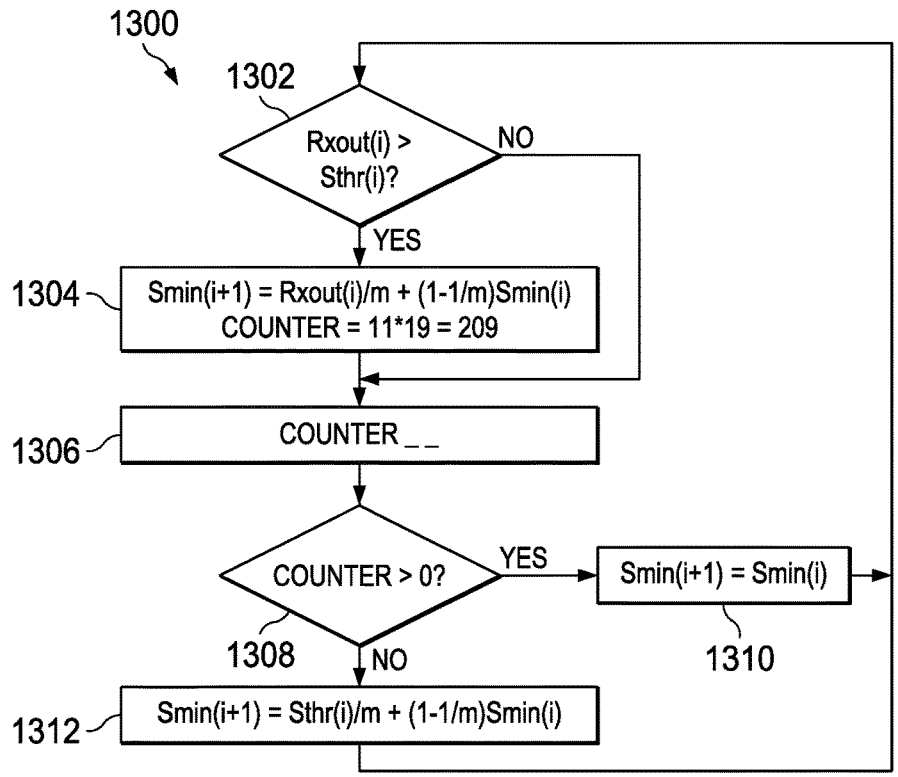
FIG. 13 is a flow chart of an example of a process for computing a minimum parameter for an S-FSK frequency signal.

With reference to FIGS. 12 and 13, an example of a process for calculating a maximum value, a minimum value, and a threshold (T) for a given frequency signal that considers the following:
RX output data @ i-th time increment (on a particular mark/space output): Rxout(i);
State of min/max filters at i-th time increment: Smin(i), Smax(i); and
Threshold: Sthr(i)
In this example, the threshold level is not fixed. The threshold is calculated based on the data itself during transmission at one of the frequencies and during the silent period. Every cycle, the minimum and maximum values are calculated by tracking the received signal. Then, the threshold will be updated for the next cycle based on the MIN and MAX values of the preceding cycle.

With further reference to FIG. 12 an example of a process 1200 for calculating a maximum value for a given frequency signal begins by comparing Rxout(i) for the frequency signal to an Sthr(i) for the threshold (1202). If Rxout(i) is greater than Sthr(i), the process continues to 1204; otherwise, the process bypasses 1204 and continues to 1206. At 1204, an intermediate maximum value (Smax(i+1)) is set equal to Rxout(i)/m+(1-1/m)Smax(i) and a counter is set to 209. At 1206, the counter is decremented. Next, the counter is compared to zero (0) (1208). If the counter is greater than zero (0), the process continues to 1210; otherwise, the counter is zero (0) and the process continues to 1212. At 1210, the intermediate maximum value (Smax(i+1)) is set equal to Smax(i) and the process returns to 1202. At 1212, the intermediate maximum value (Smax(i+1)) is set equal to (1-1/m)Smax(i) and the process returns to 1202.

With further reference to FIG. 13 an example of a process 1300 for calculating a minimum value for a given frequency signal begins by comparing Rxout(i) for the frequency signal to an Sthr(i) for the threshold (1302). If Rxout(i) is less than Sthr(i), the process continues to 1304; otherwise, the process bypasses 1304 and continues to 1306. At 1304, an intermediate minimum value (Smin(i+1)) is set equal to Rxout(i)/m+(1-1/m)Smin(i) and a counter is set to 209. At 1306, the counter is decremented. Next, the counter is compared to zero (0) (1308). If the counter is greater than zero (0), the process continues to 1310; otherwise, the counter is zero (0) and the process continues to 1312. At 1310, the intermediate minimum value (Smin(i+1)) is set equal to Smin(i) and the process returns to 1302. At 1312, the intermediate minimum value (Smin(i+1)) is set equal to (Sthr(i)/m+1-1/m)Smin(i) and the process returns to 1302.

Figure 14:
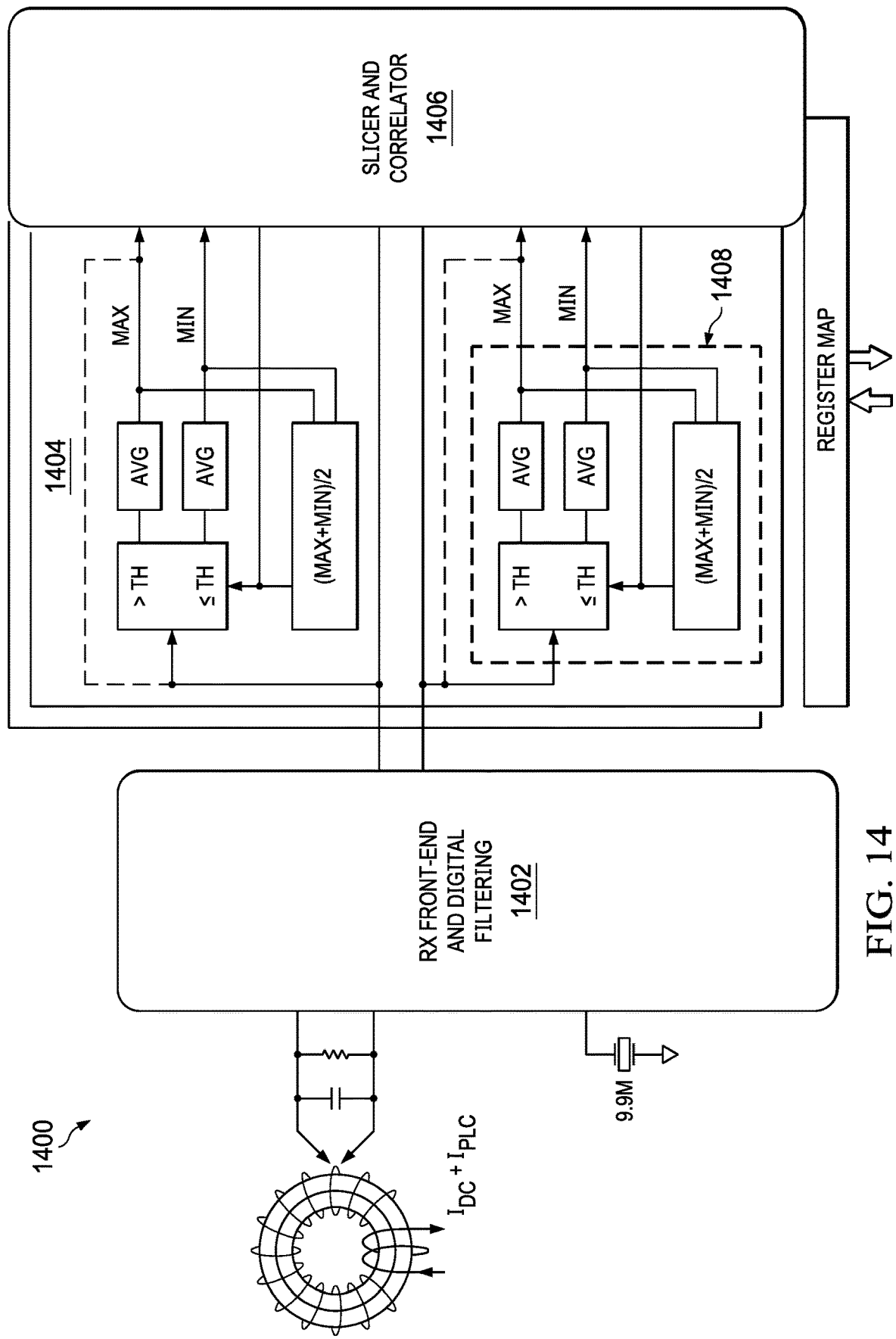
FIG. 14 is a block diagram of an example of an S-FSK receiver architecture.

With reference to FIG. 14, an example of an S-FSK receiver architecture 1400 shows circuitry the implements the flow charts of FIGS. 12 and 13 for each of the $f_M$ and $f_S$ frequency signals. The front-end and digital filtering circuit 1042 provides the $f_M$ and $f_S$ frequency signals to the threshold computation circuit 1404 and the slicer and correlator 1406. The computation circuit 1404 provides the MAX, MIN, and threshold (T) values 1408 for both the $f_M$ and $f_S$ frequency signals to the slicer and correlator 1406. The slicer and correlator 1406 can use the MAX, MIN, and threshold (T) values 1408 to determine the value of the digital data bits in the $f_M$ and $f_S$ frequency signals.

The various examples of a threshold computation circuit 1404 describe a solution with a low complexity, practical method for calculating the decision threshold in FSK and OOK systems. The threshold does not need any apriori channel statistics or transmit/receive signal power levels. The threshold calculation automatically adapts to both changes in channel/noise and transmit/receive signal power levels. The threshold computation circuit 1404 avoids the use of automatic gain control (AGC) techniques to adjust the signal power level. This reduces the complexity of the front-end and digital filtering circuit 1402 as well as the threshold computation circuit 1404. The threshold computation circuit 1404 works with dynamically varying signal amplitude and dynamically varying SNR. The threshold computation circuit 1404 deals with the zero-energy period in the frequency signals by not adjusting the MIN and MAX values when the signal has zero energy and, thus, does not adapt the threshold during the zero-energy period.

The threshold computation circuit 1404 permits an intelligent slicer 1406 to determine the value of the digital data bits in the $f_M$ and $f_S$ frequency signals based on an adaptive threshold computation. In other words, the threshold $T=\frac{1}{2}*$[avg. (ON-power)+avg. (OFF-power)] can be adapted every cycle (e.g., each S-FSK frame) using the threshold T and MAX and MIN value parameters 1408 dynamically calculated by the threshold computation circuit 1404. For example, the threshold computation circuit 1404 facilitates implementation of S-FSK communication systems designed to comply with SunSpec Interoperability Specification, Communication Signal for Rapid Shutdown, Version 34.

Figure 11:
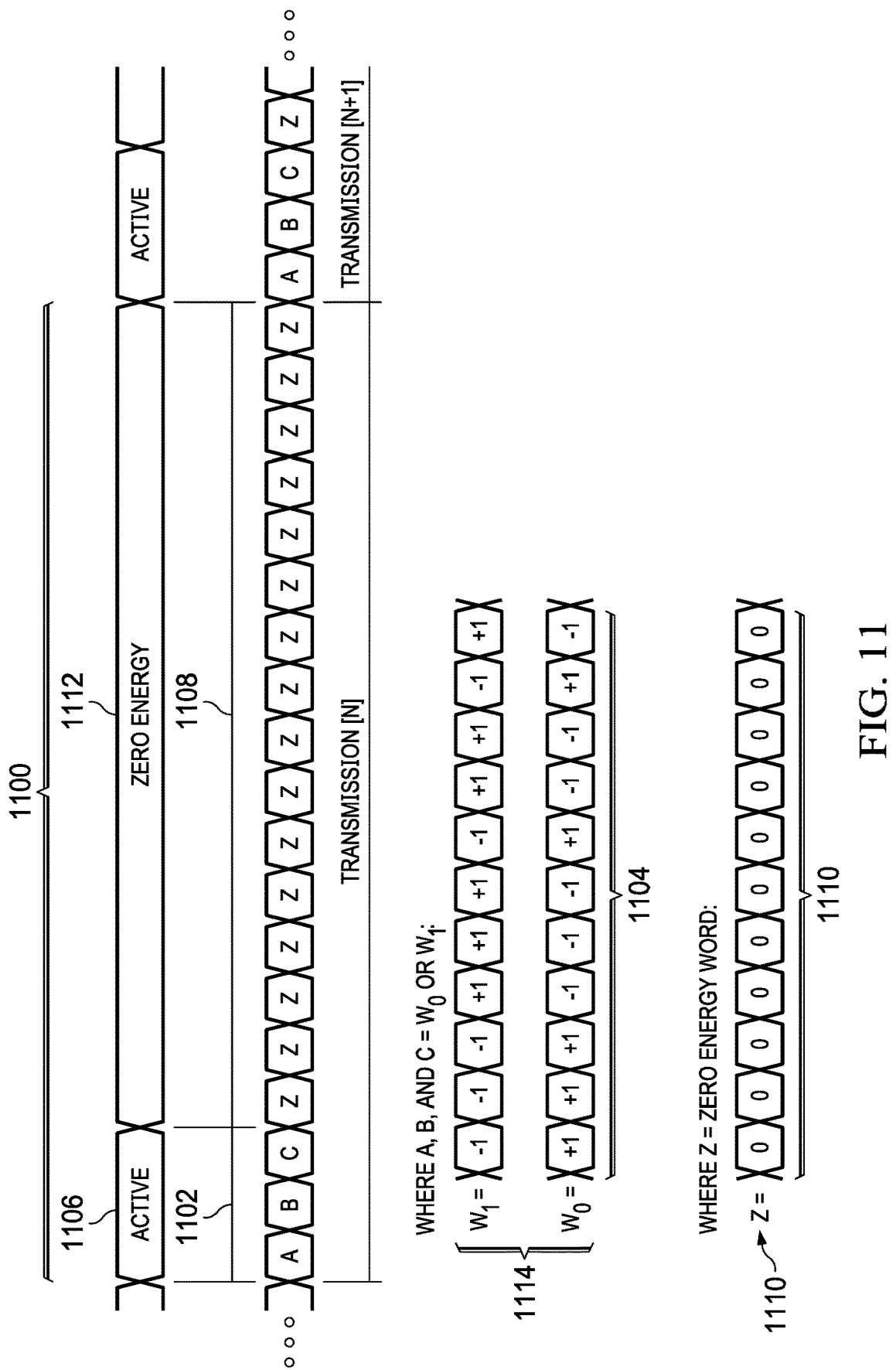
FIG. 11 is a diagram of an example of an S-FSK communication frame, code words, and zero energy words.

With reference again to FIG. 11, in accordance with the SunSpec Interoperability Specification, an S-FSK frame 1100 consists of three words 1102 with 11-bit periods 1104 during an active portion 1106 and 16 words 1108 with 11-bit periods 1110 during a zero energy portion 1112. During the active portion 1106, each word 1114 includes approximately 50%+1's and approximately 50%−1's. For example, five or six bits that are +1's and six or five bits that are −1's. During the zero energy portion 1108, each word 1116 includes 11 bits that are all 0's.

On the individual "mark" and "space" frequency signals, this means per frame 1100:

3×11×0.5−16 ones; and

3×11×0.5+16×11×1−192 zeros (e.g., 12× more zeros than ones).

The threshold computation circuit may update the threshold using an averaging filter obtained by setting t=m*TS, m=2k:

$$y(n+1) = x(n) \cdot \frac{1}{m} + y(n) \cdot \left(1 - \frac{1}{m}\right)$$

Figure 15:
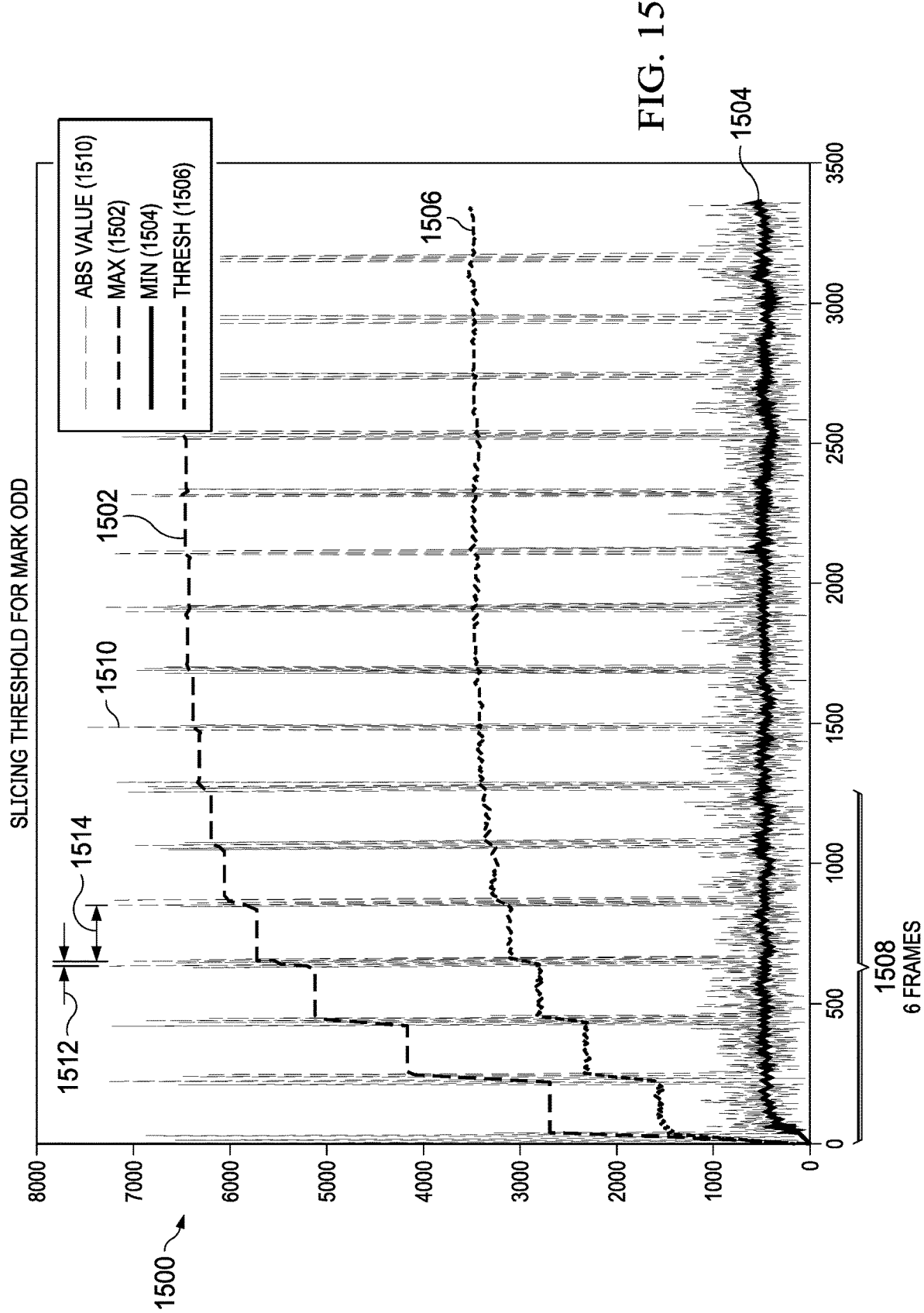
FIG. 15 is a graph showing computed MAX parameter, MIN parameter, and threshold (T) values from startup of an S-FSK waveform over a series of communication frames.

The threshold solution can consider corner conditions, such as larger interferer on one or both channels, and abrupt changes in the received SNR. On initial start of communication, the threshold calculated by the threshold computation circuit can become stable within a few S-FSK frames (e.g., four to six frames) to reduce startup time. With 16 ones per frame, choose m no greater than 32 in order to stabilize the threshold value after approximately three time constants, which is 6 frames (~secs). For example, the graph 1500 of FIG. 15 shows the MAX parameter 1502, MIN parameter 1504, and threshold (T) value 1506 stabilizing after six S-FSK frames 1508. The S-FSK frames are reflected in FIG. 15 by the absolute value representation 1510 of the frequency signal which peaks during the active portion 1512 of the frame and is reduced to a noise level during the zero-energy portion 1514 of the frame. The threshold (T) value 1506 in FIG. 15 is the graphed line that reaches 3,000 to 3,500 after four to six frames 1508.

During the extended periods of zeros, the threshold remains (relatively) stable. This means the filter does not react with the time constant during the zeros period, as it lasts many time constants (e.g. 192/16=12 time constants) and the threshold would have entirely decayed forcing the subsequent frame to be equivalent to a fresh startup for the threshold computation. Thus, the threshold computation circuit does not update the filter state when no above/below threshold samples appear on the respective frequency signal.

The threshold computation circuit may include a do-not-update filter state for the zero-energy portion to simplify the algorithms used to calculate the MAX and MIN parameters and the threshold value. In order to be prepared for the first data bit in the active portion of the next S-FSK frame, the threshold computation circuit may include a time-out associated with the do-not-update filter state. To accommodate signal amplitude changes, the do-not-update-filter period can be time-limited. The hold may be limited to one frame. For example, if there hasn't been an update for more than one frame duration (e.g., 209 samples), the hold could be released. This could be done for the MAX- and MIN-filters. In case a blocker passes the Goertzel algorithm in the front-end and digital filtering circuit, it is possible that no further samples fall below threshold, which will prevent update of the MIN-filter unless the timeout is provided.

Modifications are possible in the described examples, and other examples are possible, within the scope of the claims. The various circuits described above can be implemented using any suitable combination of discrete components, integrated circuits, processors, memory, storage devices, and firmware.

The following is claimed:

1. A threshold computation circuit for a spread frequency-shift keying (S-FSK) receiver, the threshold computation circuit comprising:

an input circuit, configured to receive a discrete frequency signal from a digital filtering circuit, the discrete frequency signal is based on an S-FSK waveform received by an S-FSK receiver associated with the digital filtering circuit, the discrete frequency signal is representative of digital logic levels in a series of data frames modulated using S-FSK to form the S-FSK waveform, each data frame including an active portion and a zero energy portion, the active portion includes at least one data word and the zero energy portion includes at least one zero energy word, each data word and zero energy word include multiple bit periods;

a maximum filter circuit, configured to dynamically and selectively adjust a maximum amplitude parameter during bit periods of the series of data frames, the adjusting is based on the discrete frequency signal and a predetermined threshold value;

a minimum filter circuit, configured to dynamically and selectively adjust a minimum amplitude parameter during bit periods of the series of data frames, the adjusting is based on the discrete frequency signal and the predetermined threshold value; and a calculating circuit, configured to adapt the predetermined threshold value for a next data frame based on the maximum amplitude parameter and the minimum amplitude parameter after a current data frame.

2. The threshold computation circuit of claim 1, in which the maximum filter circuit is configured to:

i) determine if the discrete frequency signal is greater than the predetermined threshold value during each bit period of the series of data frames, ii) modify the maximum amplitude parameter during each bit period of the current data frame in which the discrete frequency signal is greater than the predetermined threshold value to form a next maximum amplitude parameter for the next data frame,
iii) count each bit period of the current data frame, and
iv) change the maximum amplitude parameter to be equivalent to the next maximum amplitude parameter after counting the bit periods of the current data frame.

3. The threshold computation circuit of claim 2, in which the maximum filter circuit is configured to modify the maximum amplitude parameter in accordance with the following equation:

$$\text{max amp } param\,(i+1) = \frac{\text{discrete } freq\text{ sig}(i)}{m} + \left(1 - \frac{1}{m}\right)\text{max amp } param(i)$$

where i is a current bit period, max amp param (i+1) is the next maximum amplitude parameter for a next bit period, discrete freq sig(i) is the discrete frequency signal for the current bit period, m is less than two times an expected number of bit periods per data frame with "ON" logic levels, and max amp param (i) is the maximum amplitude parameter for the current bit period.

4. The threshold computation circuit of claim 2, in which the maximum filter circuit is configured to change the maximum amplitude parameter in accordance with the following equation:

max amp param(i+1)=max amp param where i is a current bit period, max amp param (i+1) is the next maximum amplitude parameter for a next bit period, and max amp param is the maximum amplitude parameter to be used for the next data frame.

5. The threshold computation circuit of claim 1, in which the minimum filter circuit is configured to:
i) determine if the discrete frequency signal is less than the predetermined threshold value during each bit period of the series of data frames,
ii) modify the minimum amplitude parameter during each bit period of the current data frame in which the discrete frequency signal is less than the predetermined threshold value to form a next minimum amplitude parameter for the next data frame,
iii) count each bit period of the current data frame, and
iv) change the minimum amplitude parameter to be equivalent to the next minimum amplitude parameter after counting the bit periods of the current data frame.

6. The threshold computation circuit of claim 5, in which the minimum filter circuit is configured to modify the minimum amplitude parameter in accordance with the following equation:

$$\text{min amp } param\,(i+1) = \frac{\text{discrete } freq\text{ sig}(i)}{m} + \left(1 - \frac{1}{m}\right)\text{min amp } param(i)$$

where i is a current bit period, min amp param (i+1) is the next minimum amplitude parameter for a next bit period, discrete freq sig(i) is the discrete frequency signal for the current bit period, m is less than two times an expected number of bit periods per data frame with "ON" logic levels, and min amp param (i) is the minimum amplitude parameter for the current bit period.

7. The threshold computation circuit of claim 5, in which the minimum filter circuit is configured to change the minimum amplitude parameter in accordance with the following equation:

min amp param(i+1)=min amp param where i is a current bit period, min amp param (i+1) is the next minimum amplitude parameter for a next bit period, and min amp param is the minimum amplitude parameter to be used for the next data frame.

8. The threshold computation circuit of claim 1, in which the calculating circuit is configured to:
i) calculate an updated threshold value for the predetermined threshold value based on the maximum and minimum amplitude parameters after the current data frame, and
ii) modify the predetermined threshold value for the next data frame based on the updated threshold value.

9. The threshold computation circuit of claim 8, in which the calculating circuit is configured to calculate the updated threshold value in accordance with the following equation:

$$\text{updated thresh } val = \frac{\text{max amp } param + \text{min amp } param}{2}$$

where updated thresh val is the updated threshold value calculated after the current data frame, max amp param is the maximum amplitude parameter after the current data frame, and min amp param is the minimum amplitude parameter after the current data frame.

10. The threshold computation circuit of claim 8, in which the calculating circuit is configured to modify the predetermined threshold value in accordance with the following equation:

updated thresh val=predetermined thresh where updated thresh val is the updated threshold value calculated after the current data frame and predetermined thresh is the predetermined threshold value to be used for the next data frame.

11. The threshold computation circuit of claim 1, including:
a second input circuit, configured to receive a second frequency signal from the digital filtering circuit, the second frequency signal is based on the S-FSK waveform received by the S-FSK receiver, the second frequency signal is representative of second digital logic levels in the series of data frames modulated using S-FSK to form the S-FSK waveform;
a second maximum filter circuit, configured to dynamically and selectively adjust a second maximum amplitude parameter during bit periods of the series of data frames, the adjusting is based on the second frequency signal and a second predetermined threshold value;
a second minimum filter circuit, configured to dynamically and selectively adjust a second minimum amplitude parameter during bit periods of the series of data frames, the adjusting is based on the second frequency signal and the second predetermined threshold value; and
a second calculating circuit, configured to adapt the second predetermined threshold value for the next data frame based on the second maximum amplitude parameter and the second minimum amplitude parameter after the current data frame.

12. An integrated circuit, comprising:
a threshold computation circuit, including:
- an input circuit, configured to receive a discrete frequency signal from a digital filtering circuit, the discrete frequency signal is based on a spread frequency-shift keying (S-FSK) waveform received by an S-FSK receiver associated with the digital filtering circuit, the discrete frequency signal is representative of digital logic levels in a series of data frames modulated using S-FSK to form the S-FSK waveform, each data frame including an active portion and a zero energy portion, the active portion includes at least one data word and the zero energy portion includes at least one zero energy word, each data word and zero energy word include multiple bit periods;
- a maximum filter circuit, configured to dynamically and selectively adjust a maximum amplitude parameter during bit periods of the series of data frames, the adjusting is based on the discrete frequency signal and a predetermined threshold value;
- a minimum filter circuit, configured to dynamically and selectively adjust a minimum amplitude parameter during bit periods of the series of data frames, the adjusting is based on the discrete frequency signal and the predetermined threshold value; and
- a calculating circuit, configured to adapt the predetermined threshold value for a next data frame based on the maximum amplitude parameter and the minimum amplitude parameter after a current data frame.

13. The integrated circuit of claim 12, the threshold computation circuit including:
- a second input circuit, configured to receive a second frequency signal from the digital filtering circuit, the second frequency signal is based on the S-FSK waveform received by the S-FSK receiver, the second frequency signal is representative of second digital logic levels in the series of data frames modulated using S-FSK to form the S-FSK waveform;
- a second maximum filter circuit, configured to dynamically and selectively adjust a second maximum amplitude parameter during bit periods of the series of data frames, the adjusting is based on the second frequency signal and a second predetermined threshold value;
- a second minimum filter circuit, configured to dynamically and selectively adjust a second minimum amplitude parameter during bit periods of the series of data frames, the adjusting is based on the second frequency signal and the second predetermined threshold value; and
- a second calculating circuit, configured to adapt the second predetermined threshold value for the next data frame based on the second maximum amplitude parameter and the second minimum amplitude parameter after the current data frame.

14. The integrated circuit of claim 13, including:
the digital filtering circuit, the digital filtering circuit is configured to receive the S-FSK waveform, process the S-FSK waveform to create the discrete and second frequency signals, and provide the discrete and second frequency signals to the threshold computation circuit; and
a slicer circuit, configured to receive the discrete and second frequency signals from the digital filtering circuit, receive the maximum amplitude parameter, minimum amplitude parameter, predetermined threshold value, second maximum amplitude parameter, second minimum amplitude parameter, and second predetermined threshold value from the threshold computation circuit, and generate a digital data stream based on the discrete and second frequency signals, maximum amplitude parameter, minimum amplitude parameter, predetermined threshold, second maximum amplitude parameter, second minimum amplitude parameter, and second predetermined threshold value, the digital data stream is representative of at least one of the digital logic levels and second digital logic levels in the series of data frames modulated using S-FSK to form the S-FSK waveform.

15. The integrated circuit of claim 14, including:
- a correlator circuit configured to receive the digital data stream from the slicer circuit, decode the digital data stream into code words, correlate the code words based on a predetermined protocol, and generate one or more intermediate control signals based on the code words and the predetermined protocol; and
- a keep alive circuit configured to receive the one or more intermediate control signals from the correlator circuit, process the one or more intermediate control signals to generate one or more communication signals, and provide the one or more communication signals at an output terminal.

16. A process for computing a threshold value to distinguish digital data signals of a spread frequency-shift keying (S-FSK) waveform, the process comprising:
- receiving a discrete frequency signal from a digital filtering circuit at a threshold computation circuit, the discrete frequency signal is based on an S-FSK waveform received by an S-FSK receiver associated with the digital filtering circuit, the discrete frequency signal is representative of digital logic levels in a series of data frames modulated using S-FSK to form the S-FSK waveform, each data frame including an active portion and a zero energy portion, the active portion includes at least one data word and the zero energy portion includes at least one zero energy word, each data word and zero energy word include multiple bit periods;
- dynamically and selectively adjusting a maximum amplitude parameter at the threshold computation circuit during bit periods of the series of data frames, the adjusting is based on the discrete frequency signal and a predetermined threshold value;
- dynamically and selectively adjusting a minimum amplitude parameter at the threshold computation circuit during bit periods of the series of data frames, the adjusting is based on the discrete frequency signal and the predetermined threshold value; and
- adapting the predetermined threshold value for a next data frame based on the maximum amplitude parameter and the minimum amplitude parameter after a current data frame.

17. The process of claim 16, the adjusting of the maximum amplitude parameter including:
- determining if the discrete frequency signal is greater than the predetermined threshold value during each bit period of the series of data frames;
- modifying the maximum amplitude parameter during each bit period of the current data frame in which the discrete frequency signal is greater than the predetermined threshold value to form a next maximum amplitude parameter for the next data frame;
- counting each bit period of the current data frame; and changing the maximum amplitude parameter to be equivalent to the next maximum amplitude parameter after counting the bit periods of the current data frame.

18. The process of claim 16, the adjusting of the minimum amplitude parameter including::

determining if the discrete frequency signal is less than the predetermined threshold value during each bit period of the series of data frames;

modifying the minimum amplitude parameter during each bit period of the current data frame in which the discrete frequency signal is less than the predetermined threshold value to form a next minimum amplitude parameter for the next data frame;

counting each bit period of the current data frame; and changing the minimum amplitude parameter to be equivalent to the next minimum amplitude parameter after counting the bit periods of the current data frame.

19. The process of claim 16, the adapting of the predetermined threshold value including::

calculating an updated threshold value for the predetermined threshold value based on the maximum and minimum amplitude parameters after the current data frame; and modifying the predetermined threshold value for the next data frame based on the updated threshold value.

20. The process of claim 16, including:

receiving a second frequency signal from the digital filtering circuit at the threshold computation circuit, the second frequency signal is based on the S-FSK waveform received by the S-FSK receiver, the second frequency signal is representative of second digital logic levels in the series of data frames modulated using S-FSK to form the S-FSK waveform;

dynamically and selectively adjusting a second maximum amplitude parameter at the threshold computation circuit during bit periods of the series of data frames, the adjusting is based on the second frequency signal and a second predetermined threshold value;

dynamically and selectively adjusting a second minimum amplitude parameter at the threshold computation circuit during bit periods of the series of data frames, the adjusting is based on the second frequency signal and the second predetermined threshold value; and adapting the second predetermined threshold value for the next data frame based on the second maximum amplitude parameter and the second minimum amplitude parameter after the current data frame.

* * * * *